United States Patent
Choudhury et al.

(10) Patent No.: US 7,366,104 B1
(45) Date of Patent: Apr. 29, 2008

(54) NETWORK MONITORING AND DISASTER DETECTION

(75) Inventors: Gagan Lal Choudhury, Marlboro, NJ (US); Elie M. Francis, Brooklyn, NY (US); Shih-Yue Hou, Tinton Falls, NJ (US); Beth S. Munson, Little Silver, NJ (US); Vera D. Sapozhnikova, Lincroft, NJ (US); Michael B. Wardlow, Kendall Park, NJ (US)

(73) Assignee: AT&T Corp., New York, NY (US)

( * ) Notice: Subject to any disclaimer, the term of this patent is extended or adjusted under 35 U.S.C. 154(b) by 1006 days.

(21) Appl. No.: 10/336,471

(22) Filed: Jan. 3, 2003

(51) Int. Cl.
*G01R 31/08* (2006.01)
(52) U.S. Cl. .................. 370/252; 370/229; 370/241
(58) Field of Classification Search ........ 370/252–254, 370/230–238, 389
See application file for complete search history.

(56) References Cited

U.S. PATENT DOCUMENTS

| | | | |
|---|---|---|---|
| 6,175,552 B1 | 1/2001 | Parry et al. | |
| 6,347,384 B1 | 2/2002 | Satomi et al. | |
| 6,654,352 B2 * | 11/2003 | Serikawa | 370/254 |
| 7,127,508 B2 * | 10/2006 | Edmison et al. | 709/224 |
| 2002/0143929 A1 * | 10/2002 | Maltz et al. | 709/224 |
| 2004/0039803 A1 * | 2/2004 | Law | 709/223 |

\* cited by examiner

*Primary Examiner*—Duc Ho

(57) ABSTRACT

A method of monitoring a network that includes a number of nodes interconnected by trunks has a step of obtaining processor usage data pertaining to a plurality of node processors, the processor usage data including information representative of a rate of usage of each of the plurality of node processors. The method also includes obtaining memory usage data pertaining to a plurality of memories, each of the plurality of memories associated with a node processor, the memory usage data including information representative of a rate of usage of each of the plurality of memories. The method further includes determining from the memory usage data and the processor usage data whether a network congestion event is occurring.

22 Claims, 13 Drawing Sheets

NETWORK MONITORING AND DISASTER DETECTION

Cross-reference is made to co-pending application Ser. No. 10/336,584 entitled "Network Segmentation Method", filed on even date herewith.

FIELD OF THE INVENTION

The present invention relates generally to the field of communication networks, and more particularly, to monitoring and disaster detection in communication networks.

BACKGROUND OF THE INVENTION

One common form of digital communication network is a network that employs a link-state routing protocol. Asynchronous transfer mode ("ATM") networks and Internet protocol ("IP") networks are well-known examples of networks that employ link-state routing protocols. While a large class of link state routing protocols exist, common examples include Open Shortest Path First ("OSPF"), primarily for IP networks and Private Network to Network Interface ("PNNI"), primarily for ATM networks.

IP and ATM networks are organized into one or more areas or peer groups. Each area or peer group defines an interconnected group of nodes, which are connected by trunks. End points or customer premises equipment are connected to the nodes. The network is used to provide connectivity to allow data to propagate from one end point to another end point. To this end, the data may pass through several nodes and several trunks, particularly if the two end points are connected to different nodes.

The web-like structure of nodes and trunks of the network define large numbers of alternative data paths between a particular set of two end points. In order to route traffic between the two end points, one of the data paths through the network must be selected. The selection of the path requires information regarding the availability and other status information pertaining to the trunks and nodes in the network. In the case of source routing this information is needed at the source node, and in the case of hop-by-hop routing this information is needed at the intermediate nodes as well. In either case, each node needs to maintain data records of the status of every node and trunk of the network. For trunks, the status may include availability (up or down), an administrative cost to reflect the desirability of routing over this trunk, and the amount of reserved bandwidth for one or more traffic classes. For nodes, the status may include availability (up or down), a list of neighbors to which it is connected and the identification of each trunk connecting it to a neighbor.

In order to maintain such status records, each node on the network from time to time broadcasts status update message routing control messages to all of the other nodes to apprise the other nodes of its status as well as the status of trunks connected to it. The broadcasting is effected using a technique known as "reliable flooding" in which the source node sends the control message to all its neighbors. Each neighbor sends the message to each of its neighbors in turn except for the one from which it received the message. This process is continued indefinitely except that any duplicate message received at a node is discarded and not flooded any further. The reliable flooding ensures that the routing control message will reach all nodes of the network quickly but it also results in many duplicate messages.

The routing control or status update messages are refreshed periodically, and are also sent whenever there is a change in status. By way of example, the PNNI protocol employs control messages known as PNNI Topology State Elements (PTSE) to provide status update information throughout the network. One or more PTSEs may be packed in a single PNNI Topology State Packet (PTSP). Each node provides status update information via one or more PTSEs under two different circumstances, 1) as periodically scheduled updates (typically once every 30 minutes) or 2) in response to significant changes in status. Examples of significant changes in status include a trunk failure, a substantial change in the reserved bandwidth of a trunk, or the recovery of a node or trunk.

The PNNI protocol also employs signaling messages that are used to establish or tear down "calls" or virtual circuits between endpoints of the network. Over an established virtual circuit between end points of the network, user data may be transmitted in the form of voice, facsimile, electronic mail, or otherwise. There are different types of virtual circuits including Switched Permanent Virtual Circuits (SPVC) and Switched Virtual Circuits (SVC).

The routing control messages used in OSPF are similar to those used in PNNI. The status update messages in OSPF are known as Link State Advertisements (LSAs) and one or more LSAs may be packed in a single Link State Update (LSU) message. The OSPF used for hop-by-hop routing of data packets in IP networks does not use any trunk reserved bandwidth information or signaling. However, OSPF with Traffic Engineering extension (OSPF-TE) uses trunk reserved bandwidth information and signaling is used for establishing or tearing down Multi Protocol Label Switching (MPLS) Label Switched Paths (LSP). Other link state routing protocols are likewise configured. We will use the PNNI terminology but our description would also apply to other link state protocols in a generic sense.

From time to time, scheduled and/or unscheduled events alter the status of one or more network entities (nodes and/or trunks). Scheduled events may include bringing down a subset of nodes or trunks to perform software upgrades, testing, or the like and bringing them back up at a later time. Unscheduled events may include failure of a subset of nodes and/or trunks and bringing them back up at a later time. In either case, the change in status of the nodes and/or trunks triggers a flooding of control messages as discussed above. For example, if a trunk fails or recovers, then the nodes at its two endpoints would generate routing control messages. If a node fails, then each trunk connected to it would also fail and routing control messages would be generated by its nodes at the other endpoint of the trunk. In addition to the initial flooding of status update messages, as nodes or trunks fail many SPVCs and SVCs passing through them need to be rerouted through other paths thereby generating additional signaling control messages. Furthermore, the rerouting of SPVCs and SVCs may cause many trunks to experience significant changes in reserved bandwidth which would also generate status update messages. As nodes and trunks recover, some existing SPVCs and SVCs may reroute to utilize a more optimal path which in turn would generate more signaling and routing control messages.

Thus, node and/or trunk failures can cause the propagation of multiple control messages, thereby forming a "storm". If large numbers of control messages are generated over a short period of time, then processors within the nodes that process the control data may begin to overload, the memory used to store the messages may begin to exhaust, and/or trunks may become too busy from transporting all of the control messages. The overloading of the node processors and/or the trunks could delay routing control messages and memory exhaustion may cause them to be dropped. This may result in many retransmissions of the dropped control messages, thereby worsening the storm. Moreover, if particular status maintenance messages, for example, the keep alive or Hello messages used to maintain trunk status between neighbors, are delayed excessively, then the trunk may be declared down which may cause generation of many routing and signaling control messages. In addition, when the trunk recovers (or is declared up) more routing and signaling control messages would be generated.

Thus, it has been determined that scheduled and unscheduled events can trigger a control message storm that can create positive feedback to cause additional events, thereby increasing the severity of the control message storm. Such a storm having positive feedback and potential for propagation from one congested node to others, referred to herein as a network congestion event, can create severe congestion and even failure of the network.

There is a need, therefore, for a method and/or system for preventing, or at least inhibiting the escalation of a control message storm in a network in response to a scheduled or unscheduled event. There is a further need, for a method and/or system for detecting the onset of a control message storm that may result in such escalation, so that remedial actions may be taken before significant additional network failure.

SUMMARY OF THE INVENTION

The present invention addresses at least one of the above needs by providing a method of monitoring a network by obtaining node processor usage information and node memory usage information preferably, the control of status update message rate is also obtained. In particular, it has been observed that node processor usage and node memory usage spike during control message storms. Accordingly, by monitoring these two parameters and preferably by observing the control message rate, it is possible to detect early the onset of a significant control message storm. Early detection allows for expedient remedial action to be taken, potentially preventing a total network failure, or at least reducing the severity of the event.

A first embodiment of the invention is a method of monitoring a network, the network including a number of nodes interconnected by trunks. The method includes obtaining processor usage data pertaining to a plurality of node processors, the processor usage data including information representative of a rate of usage of each of the plurality of node processors. The method also includes obtaining memory usage data pertaining to a plurality of memories, each of the plurality of memories associated with a node processor, the memory usage data including information representative of a rate of usage of each of the plurality of memories. The method further includes determining from the memory usage data and the processor usage data whether a network congestion event is occurring.

Another embodiment of the invention is a system for determining whether a network congestion event is occurring in a network. The system includes a processor arrangement that comprises one or more connected processors. The processor arrangement is operable to obtain at least one of processor usage data, memory usage data, and status update message rate data. The processor usage data includes information representative of a rate of usage of each of a plurality of node processors. The memory usage data includes information representative of a rate of usage of each of a plurality of memories, each of the plurality of memories associated with a node processor. The status update message rate identifies a rate at which status update messages are generated, each of the status update messages comprising an information message identifying an update in status of a network entity. The processor arrangement is further operable to determine from the at least one of processor usage data, memory usage data, and status update message rate data whether a network event is occurring.

The above described features and advantages, as well as others, will become more readily apparent to those of ordinary skill in the art by reference to the following detailed description and accompanying drawings.

DETAILED DESCRIPTION

Figure 1:
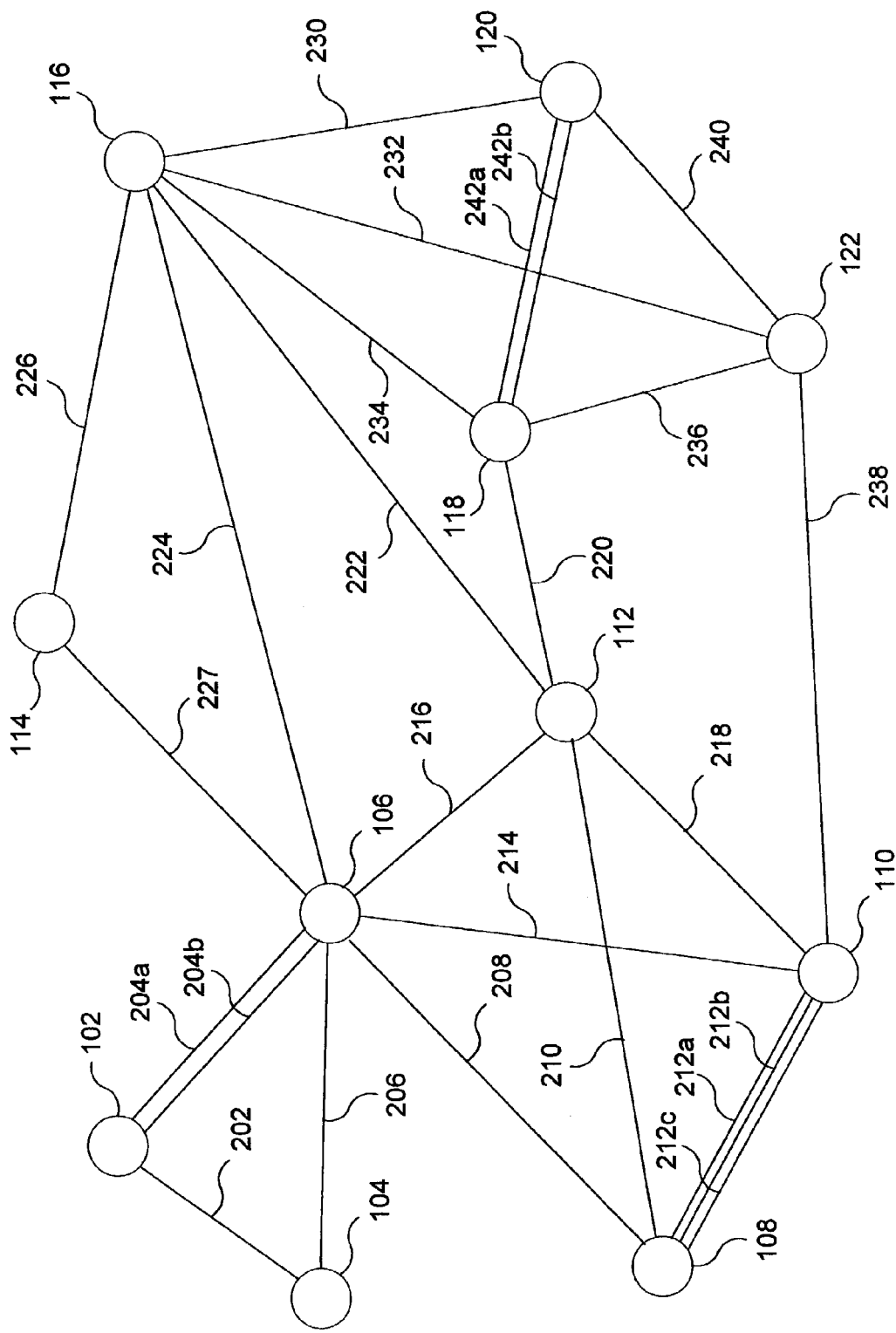
FIG. 1 shows an exemplary network area in which the present invention may be implemented.

FIG. 1 shows a network area 100 in which the present invention may be implemented. The network area 100 may be one of several network peer groups or areas in a multi-layer network. For purposes of clarity of exposition, the network peer group or area 100 will be referred to generally herein as simply the network 100. The network 100 may suitably be an ATM network, IP network, or other network that employs link-state routing protocols such as PNNI or OSPF, among others. In the exemplary embodiment described herein, the network 100 is described as an ATM network that employs PNNI. However, it will be appreciated that the operations described herein apply to a broad range of networks using a broad range of link state routing protocols.

Referring specifically to FIG. 1, the network 100 includes a plurality of nodes 102, 104, 106, 108, 110, 112, 114, 116, 118, 120 and 122, which are interconnected by a number of links or trunks 202, 204a, 204b, 206, 208, 210, 212a, 212b, 212c, 214, 216, 218, 220, 222, 224, 226, 228, 230, 232, 234, 236, 238, 240, 242a and 242b.

As can be seen in FIG. 1, each node is typically connected to more than one other node. For example, the node 104 is connected to the node 106 via trunk 206, and is also connected to the node 102 via trunk 202. As a consequence, there may typically be multiple possible paths between any two nodes in the network. For example, to route data traffic between nodes 104 and 108, a large number of alternate paths may be used in the network 100. A first path extends from node 104, over trunk 206, through node 106, over trunk 208, to node 108. A second path extends from node 104, over trunk 202, through node 102, over trunk 204a, through node 106, over trunk 208, to node 108. A third path extends from node 104, over trunk 206, through node 106, over trunk 216, through node 112, over trunk 220, through node 118, through trunk 236, through node 122, over trunk 238, through node 110, over trunk 212c, to node 108. It can be thus seen that a large number of alternate paths exist between nodes 104 and 108.

Sometimes, multiple trunks connect the same two nodes. For example, nodes 102 and 106 are connected by two trunks 204a and 204b. Similarly nodes 108 and 110 are connected by two trunks 212a, 212b and 212c. Multiple trunks are necessary in some instances because the volume of traffic between two nodes may require more bandwidth than what is available over a single trunk. Such multiple trunks, for example 212a, 212b and 212c represent different network entities that may be taken down or reinstated individually.

In general, each of the trunks 202, 204a, 204b, 206, 208, 210, 212a, 212b, 212c, 214, 216, 218, 220, 222, 224, 226, 228, 230, 232, 234, 236, 238, 240, 242a and 242b is a data conduit that includes physical data transporting equipment. In the embodiment described herein, each trunk can transport data in a bidirectional manner to and from the nodes to which it is connected. For example the trunk 206 may transport data from the node 106 to the node 104, and from the node 104 to the node 106.

In general, each of the nodes 102, 104, 106, 108, 110, 112, 114, 116, 118, 120 and 122 includes a switch that can switch or route data among and between the trunks to which it is connected. Each of the nodes may further be connected to end points, such as customer equipment or the gateway to another network, which are not shown in FIG. 1.

Figure 2:
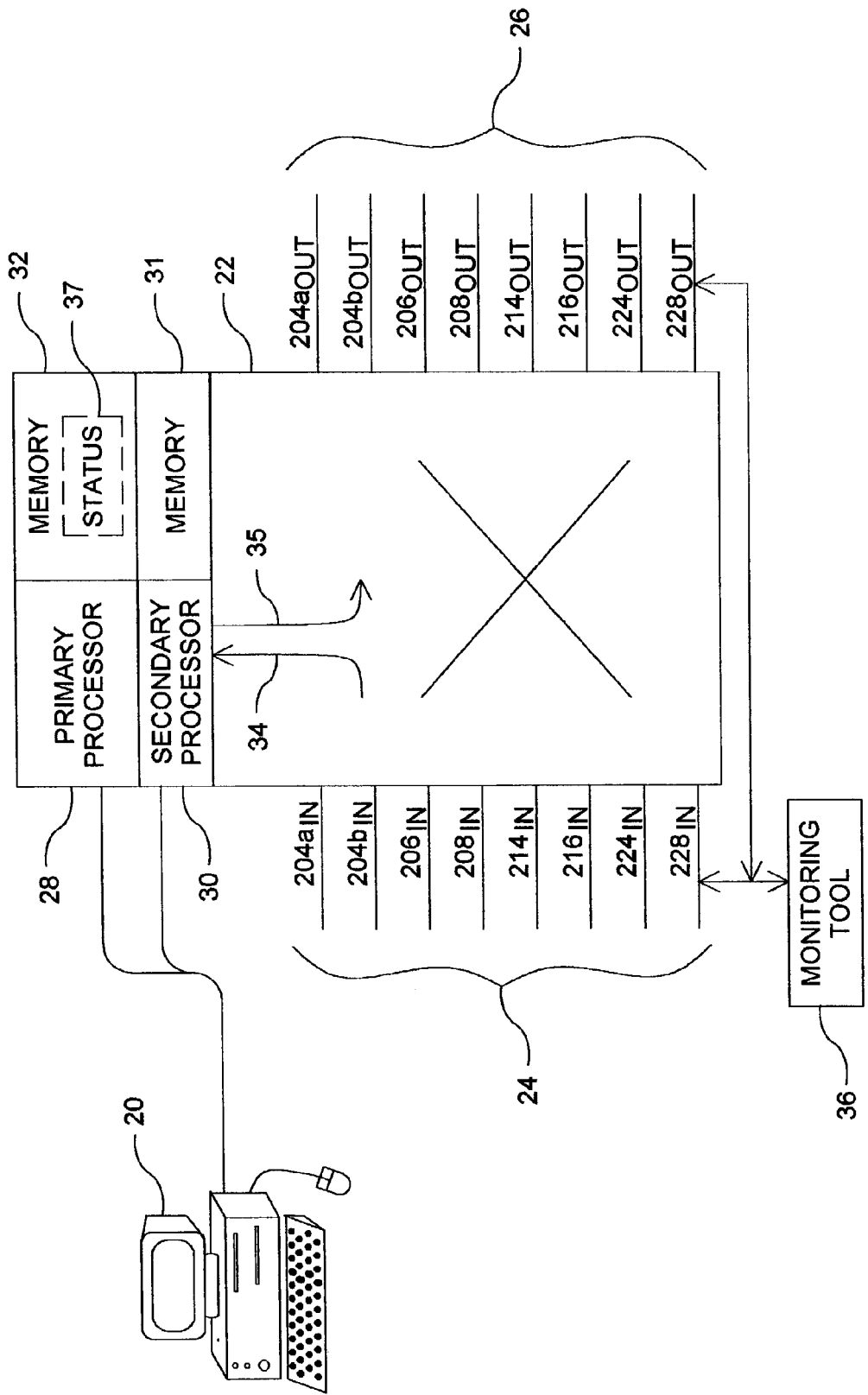
FIG. 2 shows an exemplary office that includes a node that is employed in the network area of FIG. 1.

FIG. 2 shows a block diagram schematic of an exemplary node 106 from FIG. 1. It will be appreciated that other nodes of FIG. 1 may suitably have a similar configuration. Referring now to FIG. 2, the node 106 is disposed within a switching office that further includes an administrative computer 20. Other nodes are located in other switching offices that may or may not include their own administrative computer 20.

The node 106 includes a switch 22, a set of trunk inputs 24, a set of trunk outputs 26, a primary node processor 28, a secondary node processor 30, a primary memory 32, a secondary memory 31, a processor switched input 34 and a processor switched output 35. In general, the switch 22 is operable to switch between any of the trunk inputs 24 and the trunk outputs 26. The switch is also operable to switch between any of the trunk inputs 24 and the processor switched input 34 and between the processor switched output 35 and any of the trunk outputs 26. In this manner, the primary node processor 28 (and the secondary node processor 30) may communicate with other node processors of other nodes on the network 100 via the trunk inputs 24 and trunk outputs 26.

It is to be noted that even though the trunk input 204ain and trunk output 204aout are shown separately on two sides of the switch 22, this is only a conceptual diagram. In actual implementation, each trunk is full duplex and both the input and output sides are typically physically collocated.

The primary node processor 28 is operably coupled to the memory 32 as well as the switched input 34 and the switched output 36. The primary node processor 28 is further coupled to the administrative computer 20. The primary node processor 28 is a processing circuit that is configured to control the operation of the switch 22 as is generally known in the art. To this end, the primary node processor 28 assists in setting up connection paths for calls, sending and receiving signaling messages, and other tasks typically associated with a network node processing circuit.

The primary node processor 28 is further operable to receive and generate routing control messages in the form of PTSEs. The primary node processor 28 also maintains a status database 37 in the memory 32. The status database 37 is a collection of data records that contain status information on each node and trunk of the network. The primary node processor 28 updates the status database 37 in response to received PTSEs. In the exemplary embodiment described herein, the status database 37 retains one or more status records or messages for each node and trunk on the network 100.

The primary node processor 28 is further operable to generate PTSEs regarding the status of the node 106 and PTSEs regarding the status of any of the attached trunks, including trunks 204a, 204b, 206, 208, 214, 216, 224 and 228. The primary node processor 28 is operable to broadcast these PTSEs to all of the active nodes on the network 100 using the reliable flooding mechanism described earlier.

The secondary node processor 30 is similar to the primary node processor 28, and is configured to provide all of the functionality of the primary node processor 28 in the event of a failure or disconnection of the primary node processor 28. In other words, the secondary node processor 30 provides redundancy control over the switch 22.

It will be appreciated that although only one primary node processor 28 is shown, the tasks performed by it may be distributed over many processors some of which may be stand alone and some of which may have associated redundant secondary processors. Typically there may be one central primary processor which has full redundancy and many peripheral processors which may have partial redundancy.

The switch 22 is a network switching system, which may comprise, for example, a space switch, or a time-space-time switch as is known in the art. The switch 22 generally provides for selective connectivity between the trunks 204a, 204b, 206, 208, 214, 216, 224 and 228, as well as between any of the trunks and the primary node processor 28 (or secondary node processor 30).

To provide the selective connectivity, the switch 22 selectively connects an incoming path from the trunks 204a, 204b, 206, 208, 214, 216, 224 and 228 to an outgoing path of the trunks 204a, 204b, 206, 208, 214, 216, 224 and 228. For example, the switch may selectively connect trunk 204ain to trunk 214out. It is to be noted that there are various possibilities of switching traffic from an input trunk 24 to an output trunk 26. In an IP network with hop-by-hop routing, each data packet coming over an input trunk is examined by the primary node processor 28 and, based on its destination address and the routing table, it is transmitted over one of the output links. In an ATM network, determination of the output trunk for a data packet belonging to an established SPVC or SVC may be done by just examining the Virtual Path Identifier (VPI) and Virtual Channel Identifier (VCI) which is faster than examining the destination address. In an MPLS network, determination of the output trunk for a data packet belonging to an established Label Switched Path (LSP) may be done by just examining the Label which is faster than examining the destination address.

The administrative computer 20 is operably connected to the node processors 28 and 30 to communicate data therewith. The administrative computer 20 may be used to create user applications that use data generated or collected by the node processors 28 and 30. By way of example, the administrative computer 20 may execute programs that perform one or more of the network monitoring operations described below in connection with FIGS. 3-11, as will be discussed below in further detail.

The administrative computer 20 may also be used to create scripts or programs to be executed by the node processors 28 and 30. Preferably, the administrative computer 20 is connected via a network to other administrative computers that are connected to other nodes. The administrative computers of various nodes may either be connected to each other through the network 100 itself, or through a different network. As will be discussed below, the administrative computer 20 performs many of the operations of FIGS. 3-11 based on communications to and from either node processors or administrative computers in other nodes.

All nodes do not necessarily have administrative computers. Moreover, in alternative embodiments, many or all of the operations of FIGS. 3-11 may instead be performed primarily through the node processor 28 and the node processors of other nodes. However, even in such a case, user interface with the node processor 28 may require some type of administrative computer or terminal.

Otherwise, the other nodes 102, 104, 108, 110, 112, 114, 116, 118, 120 and 122 of the network 100 have a generally similar configuration as that of the node 106 shown in FIG. 2. More specifically, each of the nodes 102, 104, 108, 110, 112, 114, 116, 118, 120 and 122 includes at least one node processor, a switch that connects the trunks that terminate in the node, and a memory for storing the status database.

The general operation of the network 100 is described with reference to FIGS. 1 and 2 contemporaneously. In general, the elements of the network 100 operate to provide connection paths between the various nodes of the network via the various trunks. The elements of the network 100 further cooperate to detect network events that could, if left unmitigated, result in a major network congestion event due to a control message storm (for example, PTSE storm in an ATM network). Elements of the network 100 also cooperate to mitigate network events to reduce the severity of the event, including possible segmentation of the network 100 in extreme cases.

In normal operation, call data from end point users is transmitted from one node to another node. For example, consider a SVC call that is to be connected from the node 106 to the node 120. The originating node 106 first determines a suitable connection path to the node 120. As discussed above, several alternative paths may be used to connect any two end points. The connection between the node 106 and the node 120 is no exception. For example, one potential path would be through nodes 112 and 118, another potential path would be through node 116, and still another potential path would be through nodes 110 and 122. Several other alternatives exist. Of these possible paths, a connection path is chosen based on the sum of the administration costs of the trunks along the potential paths and the status of the various nodes and trunks along the potential paths.

The administration cost of a trunk reflects the desirability of carrying traffic over the trunk with a lower cost indicating higher desirability. As an example, the physical distance, delay, or the inverse of available bandwidth may contribute to as the administrative cost. Usually, the path with the minimum cumulative administrative cost is chosen provided all nodes and trunks along the path are up and each trunk along the path has adequate spare bandwidth.

For example, assuming an administrative cost of 1 for each trunk in the network, the best connection path between nodes 106 and 120 would be over the trunk 224, the node 116, and the trunk 230. In particular, this path has a cumulative administrative cost of 2, which is smaller than the cumulative administrative cost of any other possible path. If, however, either of the trunks 224 or 230 are down or do not have adequate spare capacity, then this connection path cannot be used.

Software capable of selecting appropriate connection paths in networks such as the network 100 is well known.

Regardless of the methodology used to select a connection path, the first node processor 28 obtains the status data necessary to select the path from the status database 37 in the memory 32. The first node processor 28 then employs the appropriate selection methodology to determine a suitable connection path based on the network topology and the retrieved status data.

It is assumed herein that for the example to be discussed, the selected path is the path through nodes 110 and 122 via trunks 214, 238 and 240. The first node processor 28 thereafter provides signaling messages to the nodes 110, 122 and 120 to establish the connection path. To this end, the first node processor 28 forms signaling messages and provides the signaling messages to the out line 214out of the trunk 214 via the processor switched output 35. The node processor at the node 110 receives the signaling messages via its switched input, and provides continued messages onto nodes 122 and 120 in a similar manner. The nodes 110, 122 and 120 provide suitable acknowledgements, once the path is set up, back to the originating node 106.

The originating node 106 may thereafter transmit data to the node 120 through the nodes 110 and 122 via the trunks 214, 238 and 240. If the call is a duplex call, then a reverse path from node 120 to node 106 is also set up.

At the same time, the node 106 may act as an originating node for other calls, and may act as an intermediate switching node for still other calls. Call data is transferred to end point terminals at the nodes or offices by equipment further switching onto subscriber lines, not shown. Thus, every end point has one node of the network that serves as its connection point to the network 100 of FIG. 1.

In many protocols, including the PNNI protocol, control messages are sent out from time to time to provide a scheduled update to the status databases in each node. Thus, for example, the node 106 periodically sends out a status update message or PTSE to all its adjacent nodes 102, 104, 108, 110, 112, 114 and 116. Using the reliable flooding technique, the adjacent nodes 102, 104, 108, 110, 112, 114 and 116 thereafter propagate the PTSE from node 106 to all of their respective adjacent nodes except for the node from which it came. Nodes receiving the PTSE more than once ignore the additional copies. This process propagates until all nodes in the network 100 have received the PTSE from node 106. Then, at another scheduled time, another node, for example, node 108 sends out its own scheduled PTSE, which propagates in a similar manner.

Each of the nodes in the network 100 ideally receives each PTSE that is generated, and stores the PTSE in its copy of the status database stored in its memory, such as the status database 37 of the node 106. As a result, the status database of each node memory stores PTSE information for every entity in the network.

In addition to periodically generated PTSEs, a scheduled or unscheduled network event may trigger the generation of an unscheduled PTSE. For example, if trunk traffic becomes significantly different as a result of new SPVCs and SVCs using this trunk or previously existing SPVCs and SVCs leaving this trunk, the node to which the trunk is connected may send out a PTSE providing an unscheduled update informing the nodes of the network 100 that the trunk is experiencing a different level of traffic. Similarly, if a node processor detects that an adjacent trunk or node has gone down, the node processor will generate a PTSE. If the node processor detects that an adjacent trunk has recovered after being down, it will generate a PTSE. A node that has recovered after having gone down will likewise generate a PTSE to announce its recovery. As discussed above, PTSE flooding from such an event can cause new network problems, potentially resulting in a control message storm.

Figure 3:
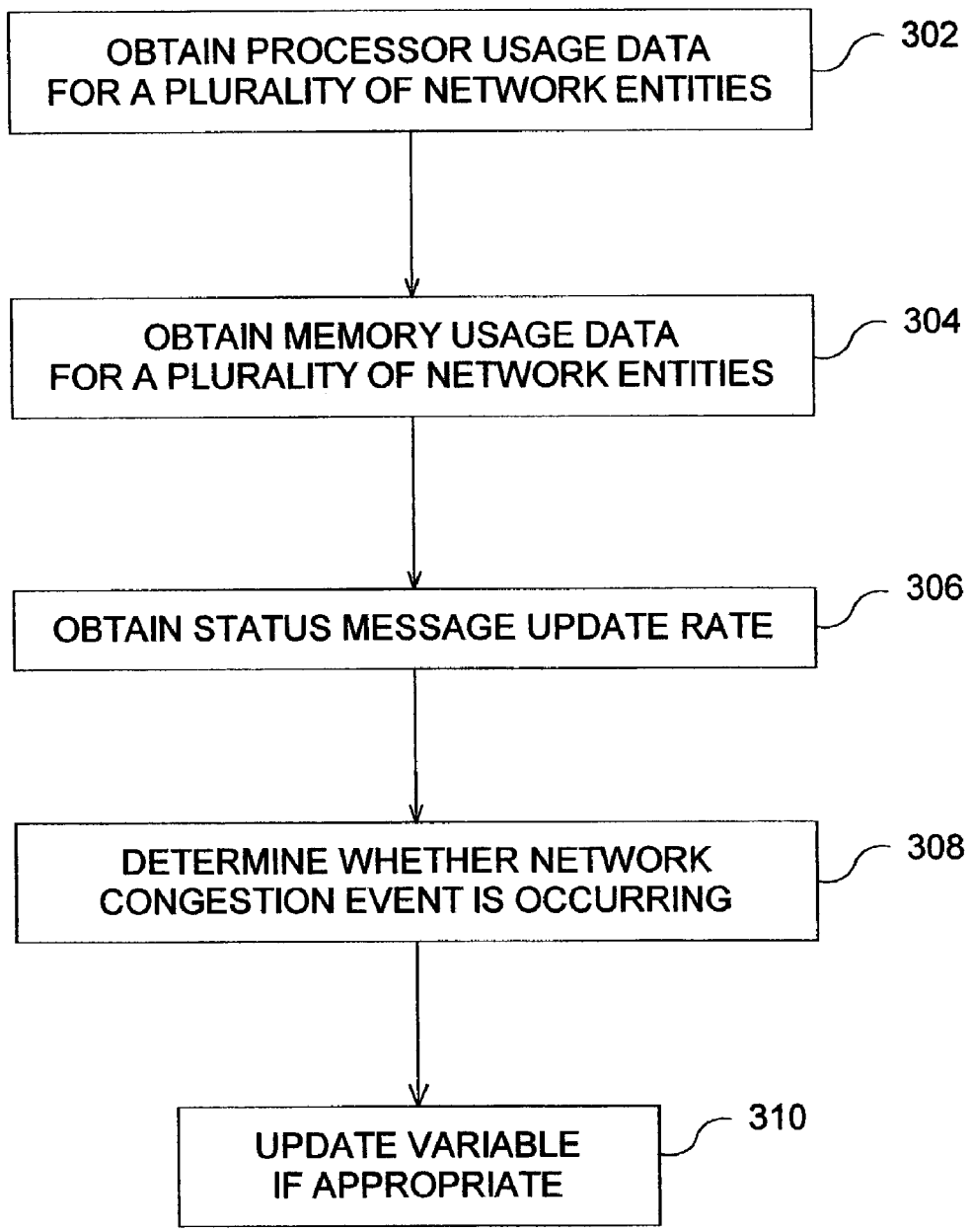
FIG. 3 shows a flow diagram of the operations of a method that incorporates aspects of the present invention.

In accordance with one aspect of the present invention, the node processor usage of one or more nodes, the memory usage of one or more nodes, and/or the PTSE update rate is monitored to determine whether the network is in danger of undergoing a potentially damaging PTSE storm. FIG. 3 discussed below, provides an overview of such a network monitoring operation.

FIG. 3 shows a flow diagram of a network monitoring operation that may be used to detect the onset of a PTSE storm. The steps of FIG. 3 may suitably be carried out by one or more administrative computers attached to a set of the nodes of the network 100, or by node processors of a set of nodes of the network 100, or a combination of both. However, in the exemplary embodiment described herein, the steps of FIG. 3 are carried out primarily by the administrative computer 20 of node 106 of FIG. 2.

Referring now specifically to FIG. 3, the administrative computer 20 network monitor in step 302 obtains node processor usage data from a plurality of nodes on the network. As discussed above, the processing of incoming and outgoing PTSEs can utilize an appreciable amount of processing time in the node processors of the nodes of the network. Accordingly, excessive processor usage observed at one or more nodes can evidence a large number of PTSE transactions. Thus, heavy node processor usage can be an indication of an existing or impending network congestion event due to a status update message or PTSE storm. Accordingly, monitoring node processor usage is useful in early detection of such events.

It is preferable to obtain processor usage data from a plurality of nodes instead of only one node because a plurality of nodes provides a better indication of the overall volume of PTSE activity, and further provides redundancy in the case in which a monitored node goes down.

Accordingly, the administrative computer 20 obtains from time to time processor usage data from a select plurality of nodes on the network 100. Moreover, a network may have several hundred nodes (and corresponding node processors), as opposed to the exemplary network 100, which contains eleven. Accordingly, it is preferable to select only a subset of those nodes for the purpose of monitoring processor usage data. The selected plurality of nodes of the network from which to obtain processor usage may be chosen based on a number of criteria. For example, it is preferable to obtain data from the nodes with the highest adjacencies, because they will send or receive more PTSEs and are likely to be overwhelmed more quickly than nodes with fewer adjacencies.

Thus, in the network 100 of FIG. 1, it may be preferable to obtain processor usage data from the nodes 106, 110 and 116, which all have at least six adjacencies (trunk terminations). It may also be preferable to obtain data from nodes of different types. For example, some nodes are access nodes that provide many connections to end point users. Other nodes are backbone nodes that primarily perform switching. Such node types are known in the art. It is preferred that a few nodes of each type be selected. The selected nodes of each type should be the nodes of that type which have the highest adjacencies. In the exemplary embodiment described herein, however, in which the network contains only eleven nodes, only the nodes 106, 110 and 116 are selected.

Figure 4:
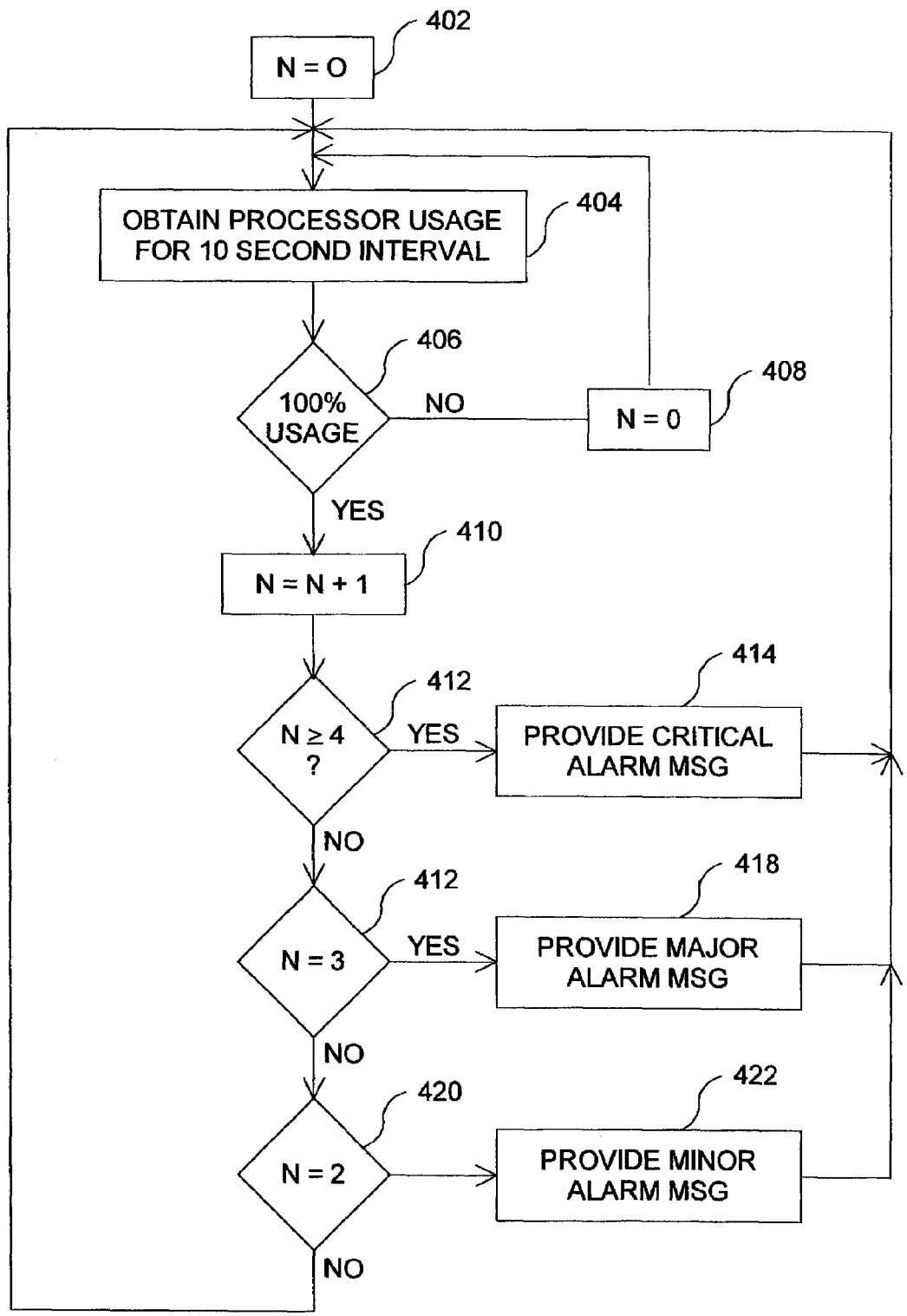
FIG. 4 shows a flow diagram of an exemplary processor usage data gathering operation of FIG. 3.

In general, the administrative computer 20 obtains data representative of processor usage in the form of raw usage data received from the node processors, or in the form of alarm data that is generated by the node processor itself, or by another administrative computer 20. FIG. 4, described further below, describes in further detail an exemplary set of operations that may be used to carry out step 302, or alternatively, the steps that may be used by another processing device to generate the usage data provided to the administrative computer in step 302.

In step 304, the administrative computer 20 obtains memory usage data from a plurality of nodes on the network. The plurality of nodes may suitably be the same plurality from which the node processor usage data is obtained. The memory usage data is useful because PTSE storms tend to cause greater usage of memory space in the memories (e.g. memory 32) of the node processors. In particular, as PTSEs start to flood the network, each node processor (e.g. the first node processor 28) must copy the PTSE and send it out to its neighbors, as discussed further above. The node processor must also store each of the copied PTSEs until the node processor receives an acknowledgement from the corresponding neighboring node that it received the copy. As a consequence, during a PTSE storm, the memories (e.g. memory 32) of each node will accumulate PTSEs that need to be acknowledged, and the memory space will be increasingly utilized. Thus, measurements indicating that node memories are substantially more full than normal can identify a possible PTSE storm.

Figure 5:
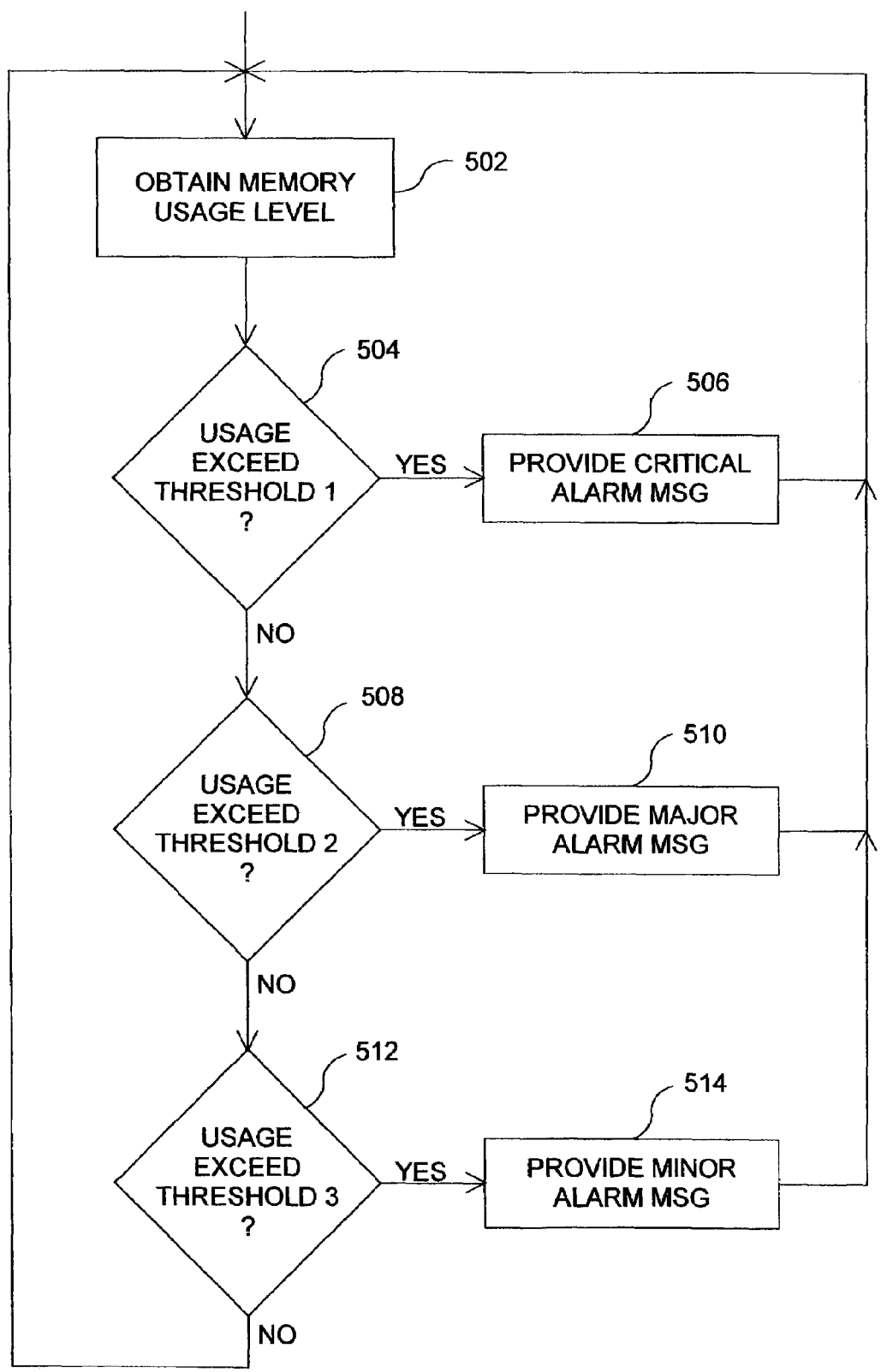
FIG. 5 shows a flow diagram of an exemplary memory usage data gathering operation of FIG. 3.

Accordingly, the administrative computer 20 in step 304 obtains data representative of memory usage from a plurality of nodes. In the exemplary embodiment described herein, the administrative computer 20 obtains memory usage data from the nodes 106, 110 and 116. The memory usage data may be raw usage data received from the node processor attached to the memories, or in the form of alarm data that is generated by the node processor itself, or by another administrative computer 20. FIG. 5, described further below, describes in further detail an exemplary set of operations that may be used to carry out step 304, or alternatively, the steps that may be used by another processor to generate memory usage data provided to the administrative computer 20 in step 304.

In step 306, the administrative computer 20 obtains a status update message rate from one or more of entities on the network. If a high rate of PTSEs is detected in the system, it can be an indicator that more will come, thereby causing a severe PTSE storm. Thus, by detecting a high frequency of PTSEs in the system, a PTSE or control message storm may be detected.

The administrative computer 20 may suitably obtain status update message rate data from the node processors of various nodes. For example, node processors may be configured to determine the number of PTSEs received over a finite amount of time. The number of PTSEs received over a period of time yields the rate at which PTSEs are received. The node processors may then communicate the status message update rates to administrative computer 20.

The administrative computer 20 may alternatively, or in addition, obtain status update message rate information from a network monitoring tool. In particular, data networks often employ monitoring tools that are connected to trunks, such as the monitoring tool 36 connected to trunk 228 as shown in FIG. 2. Such monitoring tools are known in the art, and have the capability to track and count status update messages.

Figure 6:
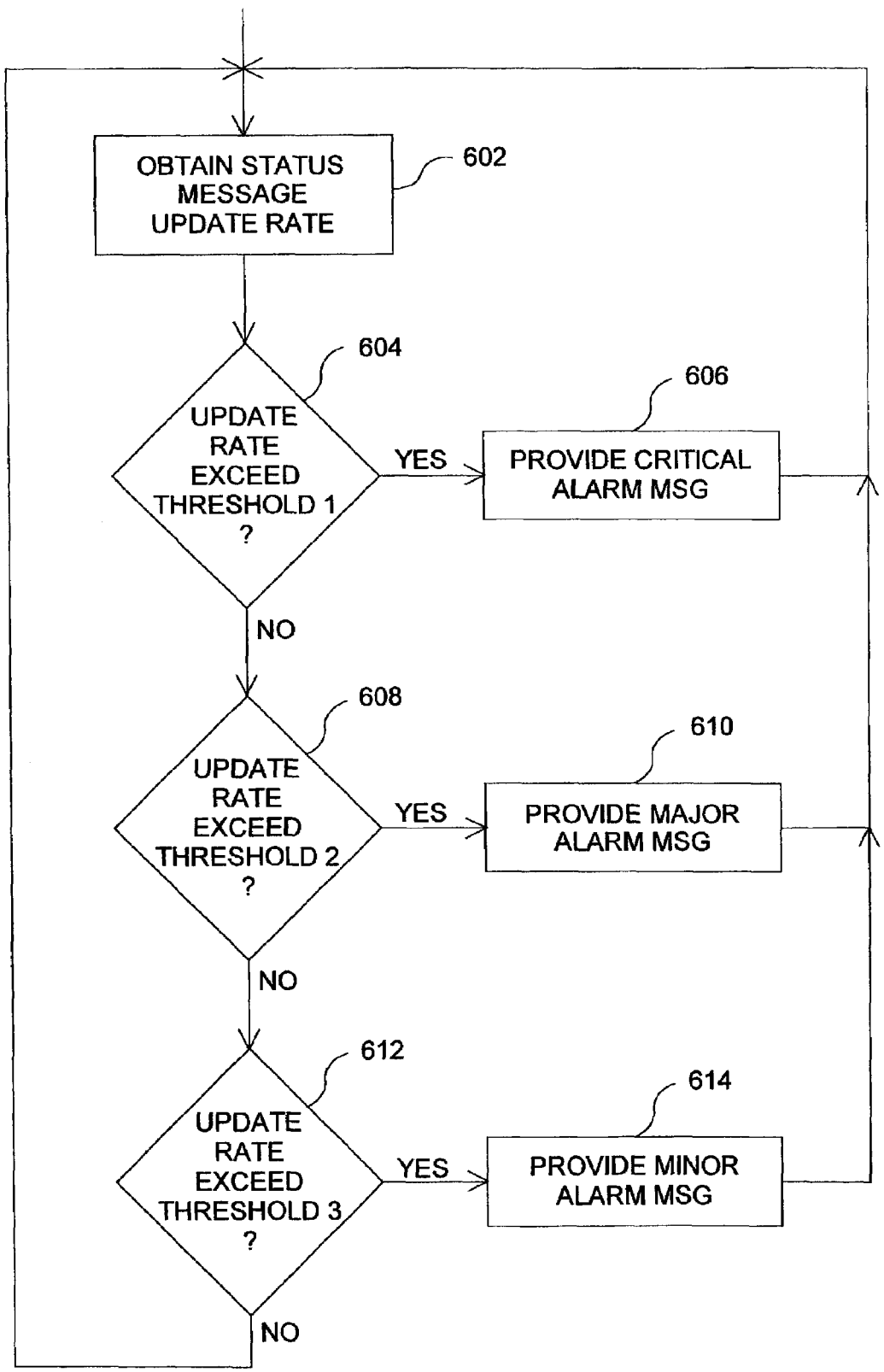
FIG. 6 shows a flow diagram of an exemplary status data update rate data gathering operation of FIG. 3.

The status message update rate data received in step 306 may be raw status update message numbers received from the node processor or monitoring device, or may be alarm data that is generated by the node processor itself, or by another administrative computer 20. FIG. 6, described further below, describes in further detail an exemplary set of operations that may be used to obtain the information provided to the administrative computer 20 in step 306.

In step 308, the administrative processor 20 determines from the received processor usage data, memory usage data, and status update message rate, whether a network congestion event is occurring. A network congestion event, as used herein, means a situation within a network wherein the number of control messages (i.e. non-data messages) exceeds the norm by an amount sufficient to warrant notice, remedial action, or closer monitoring. Generally, a network congestion event should correlate to a situation in which the chances of a control message storm self-propagating and escalating into a partial or total network failure are significant. Different network operators may set the limit to what is considered to constitute a network congestion event to different levels.

In implementation, the administrative processor 20 has predefined standards against which it compares the various monitored values, or combinations thereof, to determine if the current network situation warrants an alarm and/or intervention and remedial action. If raw processor usage, memory usage, and status message update data is received in steps 302, 304 and 306, then the received numbers may be compared individually or in groups to determine whether a network congestion event is occurring. However, if alarms are received in steps 302, 304 and 306, then the number and severity of alarms may be evaluated to determine whether a network congestion event is occurring.

In step 310, the administrative computer 20 provides a notification to another entity, such as a human operator, another software operation, one or more electronic control devices, or a combination of any of the above representative the determination that a network congestion event is occurring. Thus, notification as used herein means communication of the determination of a network congestion event either to an entity such as a human operator, another software routine, or one or more electronic devices that can attempt to effect at least some corrective action. The notification, if to a human operator, may be visual, audible, or remote electronic notification via paging, and/or any combination of the above. The administrative computer 20 may also update an internally maintained flag or variable indicating that a network congestion event is occurring.

The entity receiving the notification may then cause additional action to be taken based on the determination. The additional action may comprise increased monitoring, remedial action and/or additional notification. In many instances, the administrative computer 20 itself performs the notification of step 310, and then technicians perform remedial action with or without the assistance of the administrative computer 20. In any event, all of the above actions typically involve setting or updating at least one variable or flag updated within the administrative computer 20 when it is determined that a network congestion event is occurring.

It will be appreciated that while the above steps 302-310 employ three different data types that are indicative of network congestion, more or less data types may alternatively be employed. For example, it may be adequate to only monitor the processor usage, memory usage or both. Moreover, the monitoring of other network performance variables may be used in addition to one or more of those described above in order to yield adequate notice of an oncoming network congestion event.

FIGS. 4-7 show in further detail an exemplary implementation of the network congestion detection and remediation operations of FIG. 3. In general, FIG. 4 shows an exemplary set of operations for gathering processor usage data in the form of alarms, FIG. 5 shows an exemplary set of operations for gathering memory usage data in the form of alarms, and FIG. 6 shows an exemplary set of operations for gathering status update message data in the form of alarms. The operations of each of FIGS. 4, 5 and 6 in the exemplary embodiment described herein are executed by a processing device within the node being monitored. That processing device, which may be the node processor or an administrative computer attached to the node, provides the generated alarm information to the administrative computer 20, which then operates on the data as described below in connection with FIG. 7. Thus, in this example, the various local administrative computers report their alarm data to a master administrative computer, the administration computer 20. It will be appreciated that the administrative computer 20 may also operate as a local administrative computer to generate alarm data for the node 106.

Referring now to FIG. 4, the operations described therein may suitably be performed by the local administrative computer at any of the nodes being monitored. Thus, in the exemplary embodiment described herein in which processor usage data is obtained for nodes 106, 110, and 116, the operations of FIG. 4 may be performed by the administration computer 20 attached to the node 106, the administrative computer attached to the node 110, and the administrative computer attached to the node 116. Each local administrative computer described above performs the operations of FIG. 4 to determine whether the node to which it is attached has any alarm conditions with regard to processor usage.

In step 402, the local administrative computer resets counter n equal to 0. The counter n, as will be discussed below, tracks the number of consecutive time periods in which the attached node processor experiences 100% usage.

Thereafter, in step 404, the local administrative computer obtains a measure of the node processor usage for the next ten second interval. For example, the local administrative computer obtains a value from which the percentage of use over the ten second interval may be determined. To this end, such information is typically tracked within the node processor itself. Many commercially available processors have the ability to monitor and generate information representative of their own usage levels. Thus, in the exemplary embodiment of FIG. 1, the administrative computer of each of the nodes 106, 110 and 116 obtains the usage level information from its corresponding node processor in step 404.

Thereafter, in step 406, the local administrative computer determines whether the node processor was 100% busy during the ten second interval (the value "ten seconds" is used for the purpose of illustration and it is to be understood that other values may also be used). If so, then the local administrative computer proceeds to step 410. If not, however, then the local administrative computer resets n to zero again and returns to step 404 to obtain the processor usage measurement for the next ten second interval.

In step 410, the local administrative computer increments the counter n by one to record that a ten second interval has passed with node processor usage at 100%. The local administrative computer thereafter proceeds to step 412.

In step 412, the local administrative computer determines whether n is greater than or equal to four (the value "four" is used for the purpose of illustration and it is to be understood that other values may also be used). In other words, the local administrative computer effectively determines whether at least forty consecutive seconds have passed with the node processor usage at 100%. If so, then the local administrative computer generates a "critical" or highest level alarm in step 414. The local administrative computer preferably communicates the alarm to the master administrative computer 20, which in turn accumulates all of the alarm data from all of the nodes. (See step 302 of FIG. 3) After step 414, the local administrative computer returns to step 404 to obtain processor usage measurements for the next ten second period.

If, however, the local administrative computer in step 412 determines that n is not greater than or equal to four, then the local administrative computer proceeds to step 416. In step 416, the local administrative computer determines whether n is equal to three (the value "three" is used for the purpose of illustration and it is to be understood that other values may also be used). In other words, the local administrative computer effectively determines whether at least thirty (and less than forty) consecutive seconds have passed with the node processor usage at 100%. If so, then the local administrative computer generates a "major" or medium level alarm in step 418. The local administrative computer preferably communicates the alarm to the master administrative computer 20. After step 418, the local administrative computer returns to step 404 to obtain processor usage measurements for the next ten second period.

If, however, the local administrative computer in step 416 determines that n is not equal to three, then the local administrative computer proceeds to step 420. In step 420, the local administrative computer determines whether n is equal to two (the value "two" is used for the purpose of illustration and it is to be understood that other values may also be used). In other words, the local administrative computer effectively determines whether at least twenty (and less than thirty) consecutive seconds have passed with the node processor usage at 100%. If so, then the local administrative computer generates a "minor" or low level alarm in step 422. The local administrative computer preferably communicates the alarm to the master administrative computer 20. After step 422, the local administrative computer returns to step 404 to obtain processor usage measurements for the next ten second period.

If, however, the local administrative computer in step 420 determines that n is not equal to two, then the local administrative computer returns directly to step 404 to obtain processor usage measurements for the next ten second period. In such a case, no alarms are communicated to the master administrative computer 20.

The above described steps of FIG. 4 illustrate an exemplary method by which processor usage data may be gathered in accordance with step 302 of FIG. 3. Separate nodes perform the steps of FIG. 4 and provide the alarm data to a single processing device, which in the exemplary embodiment described herein is the "master" administrative computer 20 of node 106. However, it will be appreciated that other methods of gathering node processor usage data may be used. For example, the node processors of the various nodes may provide usage information directly to the master administrative computer 20, such that the administrative computer 20 itself performs the steps of FIG. 4 for all nodes. Alternatively, the node processors of the various nodes (as opposed to local administrative computers) may perform the steps of FIG. 4, and report the results (in the form of alarms) to the master administrative computer 20 either directly over the network 100, or via their local administrative computers.

FIG. 5 shows an exemplary set of operations for gathering memory usage data in the form of alarms from each of a plurality of nodes. The operations of FIG. 5 may suitably be performed by the local administrative computer at any of the nodes being monitored. Thus, in the exemplary embodiment described herein, the operations of FIG. 5 may be performed by the administration computer 20 attached to the node 106, the administrative computer attached to the node 110, and the administrative computer attached to the node 116. Each local administrative computer described above performs the operations of FIG. 5 to determine whether the node to which it is attached has any alarm conditions with regard to memory usage.

In step 502, the local administrative computer obtains a measure of the memory usage for the node. In other words, the administrative computer obtains a value representative of how full the memory is. The memory is the memory in which the node processor stores the node and trunk status information, for example, the status database including PTSEs. (E.g. the memory 32 from the node 106 of FIG. 2).

To this end, such information is typically available from the node processor. Most processors have the ability to monitor and generate information representative of the available memory in an attached memory. The local administrative computer of each of the nodes 106, 110 and 116 obtains the memory usage level information from those node processors in step 502. For example, the administrative computer 20 may receive the usage information from the primary node processor 28 to obtain data indicative of utilization of the memory 32 for the node 106.

Thereafter, in step 504, the local administrative computer determines whether the memory usage exceeds a first threshold. If so, then the local administrative computer generates a "critical" or highest level alarm in step 506. The local administrative computer preferably communicates the alarm to the master administrative computer 20 in the embodiment described herein. After step 506, the local administrative computer returns to step 502 to obtain subsequent memory usage measurements.

If, however, it is determined in step 504 that the memory usage does not exceed a first threshold, then the local administrative processor proceeds to step 508. It will be appreciated that the level of memory usage that causes a critical alarm may readily be determined by those of ordinary skill in the art based on the particular implementation of the memory and the node. However, the first threshold (critical alarm threshold), preferably corresponds to a level of memory usage that is close to creating a failure of some element of the network. For example, the first threshold may represent a number near 100% memory usage (e.g. 95% usage), as 100% memory usage would render the node processor incapable of storing further PTSEs, which would in turn result in further damage on the network 100.

Assuming that no critical alarm is generated, the local administrative computer in step 508 determines whether the memory usage exceeds a second threshold. If so, then the local administrative computer generates a "major" or medium level alarm in step 510. As with step 506, the local administrative computer communicates the alarm to the master administrative computer 20. After step 510, the administrative computer returns to step 502 to obtain subsequent memory usage measurements.

If, however, it is determined in step 508 that the memory usage does not exceed the second threshold, then the local administrative processor proceeds to step 512. In step 512, the local administrative computer determines whether the memory usage exceeds a third threshold. If so, then the administrative computer generates a "minor" or lowest level alarm in step 514. The local administrative computer then communicates the alarm to the master administrative computer 20. After step 514, the local administrative computer returns to step 502 to obtain subsequent memory usage measurements.

If, however, it is determined in step 514 that the memory usage does not exceed the third threshold, then the local administrative processor returns directly to step 502 without generating any alarms. It will be appreciated that the level of memory usage that causes minor and major alarms may readily be determined by those of ordinary skill in the art based on the particular implementation of the memory and the node. The memory usage level that is defined as the minor alarm threshold should correspond to a level that exceeds, at least to some degree, the memory usage level observed during normal circumstances. The major alarm threshold is defined to fall between the minor alarm threshold and the critical alarm threshold.

The above described steps of FIG. 5 illustrate an exemplary method by which memory usage data may be gathered in accordance with step 304 of FIG. 3. As discussed above, separate nodes perform the steps of FIG. 5 and provide the alarm data to a single processing device, which in the exemplar embodiment described herein is the master administrative computer 20 of node 106. However, it will be appreciated that other methods of gathering memory usage data from a plurality of nodes may be used. For example, the node processors of the various nodes may obtain the data from their corresponding memories and provide usage information directly to the master administrative computer 20, such that the administrative computer 20 itself performs the steps of FIG. 5 for all nodes. Alternatively, the node processors of the various nodes may perform the steps of FIG. 5, and report the results (in the form of alarms) to the administrative computer 20 either directly over the network 100, or via their local administrative computers.

FIG. 6, as discussed above, shows an exemplary set of operations for gathering status message update data in the form of alarms relating to the rate at which status update messages are being generated. The operations of FIG. 6 may suitably be performed by local administrative computers at various nodes on the network.

In step 602, the local administrative computer obtains a measure of the status message update rate for some point on the network. This point of the network may be the node with which the administrative computer is associated, or a trunk connected to that node. The administrative computer receives status message update data from one of a plurality of data gathering points on the network. The data gathering points may include the network monitoring tools attached to various parts of the network, such as the monitoring tool 36 of FIG. 2, node processors such as the node processor 28, or by a combination of both. Each data gathering point (e.g. node processors or monitoring tools) provides data representative of how often status messages are updated. As discussed above, network monitoring tools readily have such capabilities and node processors may be programmed to determine the number of PTSEs received in a given time period.

Thereafter, in step 604, the local administrative computer determines whether the status message update rate exceeds a first threshold. If so, then the local administrative computer generates a "critical" or highest level alarm in step 606. The local administrative computer preferably communicates the alarm to the master administrative computer 20 in the embodiment described herein. After step 606, the local administrative computer returns to step 602 to obtain subsequent status message update rate data.

If, however, it is determined in step 604 that the status message update rate does not exceed a first threshold, then the administrative processor proceeds to step 608.

Assuming that no critical alarm is generated, the local administrative computer in step 608 determines whether the status message update rate exceeds a second threshold. If so, then the local administrative computer generates a "major" or medium level alarm in step 610. As with step 606, the local administrative computer preferably communicates the alarm to the master administrative computer 20. After step 610, the local administrative computer returns to step 602 to obtain subsequent status message update rate data.

If, however, it is determined in step 608 that the status message update rate does not exceed the second threshold, then the local administrative processor proceeds to step 612. In step 612, the local administrative computer determines whether the status message update rate exceeds a third threshold. If so, then the local administrative computer generates a "minor" or lowest level alarm in step 614. The local administrative computer communicates the alarm to the master administrative computer 20. After step 614, the local administrative computer returns to step 602 to obtain subsequent status message update rate data.

If, however, it is determined in step 612 that the status message update rate does not exceed the third threshold, then the local administrative processor returns directly to step 602 without generating any alarms.

It will be appreciated that the first, second and third thresholds will be determined by those of ordinary skill in the art based on the particular network implementation. The factors on which the various thresholds are based include the number of nodes on the network, the number of trunks, the maximum adjacency (i.e. number of trunks attached to one node), and the node processor capacity or power.

The above-described steps of FIG. 6 illustrate an exemplary method by which memory usage data may be gathered in accordance with step 306 of FIG. 3. However, it will be appreciated that other methods of gathering status message update rate data from a plurality of points on the network may be used. For example, the various monitoring tools and/or node processors may generate their status message update rate and provide that information directly to the administrative computer 20, such that the administrative computer 20 itself performs the steps of FIG. 6 for all monitored points on the network. Alternatively, the node processors and/or monitoring tools themselves may be programmed to perform the steps of FIG. 6, and report the results (in the form of alarms) to the administrative computer 20 either directly over the network 100, or via local administrative computers.

Figure 7:
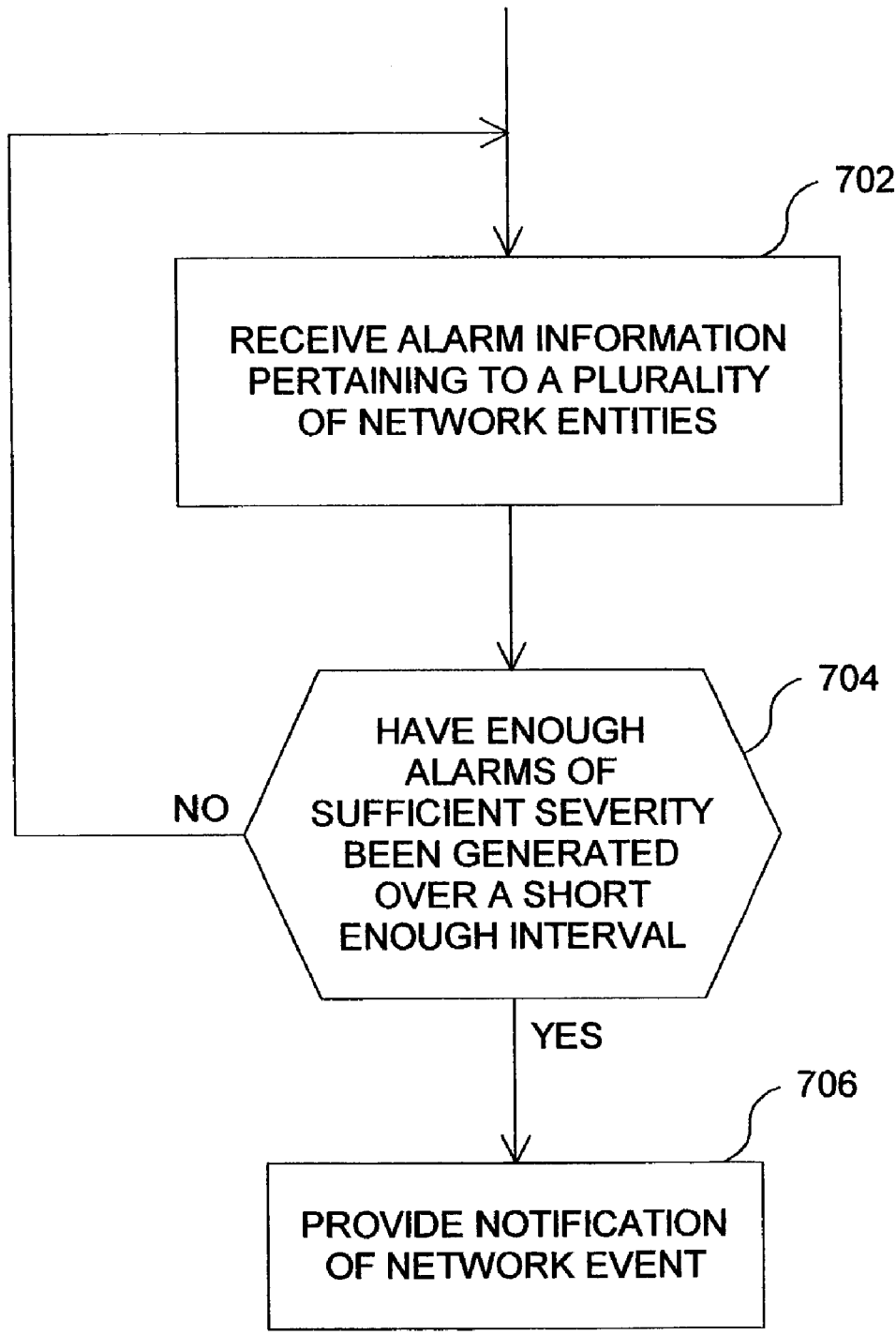
FIG. 7 shows a flow diagram of an exemplary set of operations that determine whether an event is occurring and take remedial action if an event is occurring.

FIG. 7 shows a flow diagram of an exemplary set of operations that may be carried out by one or more processors to determine whether a network event is occurring based on the alarm information generated in the operations of FIGS. 4, 5 and 6. The set of operations may be carried out by any suitable processor that receives the information generated in FIGS. 4, 5 and 6. In the exemplary embodiment described herein, it will be assumed that the operations of FIG. 7 are carried out in the administrative computer 20 associated with the node 106 of FIG. 2.

In particular, in step 702, the administrative computer 20 receives the alarm information generated in the operations of any or all of FIGS. 4, 5 and 6. Thus, for example, the administrative computer 20 obtains information indicative the number of and severity of any node processor usage alarms, memory usage alarms, and/or status message update rate alarms. It will be appreciated that step 702 of FIG. 7 corresponds to a specific implementation of steps 302, 304 and 306 of FIG. 3 as performed by the administrative computer 20 working in combination with the network elements that gather data in accordance with the operations shown in FIGS. 4, 5 and 6.

After the alarm data is received in step 702, then the administrative computer 20 proceeds to step 704. In step 704, the administrative computer 20 determines whether the number and severity of alarms received within a specified time period is indicative of the onset of a network event. The number and severity of alarms required to signify a network event may be determined by those of ordinary skill in the art and will depend upon: the number of network entities that are capable of generating alarms; the number of levels of severity of alarms; and alarm limits employed for each of the levels of severity of alarms. For example, it is contemplated that as little as one critical alarm would be required to trigger the recognition of a network congestion event, while a significantly larger number of minor alarms may be required.

One method that those of ordinary skill in the art may employ to determine the appropriate number and level of alarms required to cause identification of the potential onset of a damaging control message storm or PTSE storm is to use modeling of the network and create simulations of PTSE storms of different sizes. The simulation results predict the behavior of node processors, memories and PTSE update rates for each simulated storm size. Some of the simulated PTSE storms will be large enough to cause a chain reaction of further PTSE storms that can bring down substantial portions of the network. The processor usage levels, memory usage levels, and PTSE update levels associated with the early portions of these simulated PTSE storms should be considered in the definition of the various alarm levels. Similarly, simulated PTSE storms of lesser size, but still capable of causing significant congestion may also be observed. The processor usage levels, memory usage levels, and PTSE update levels associated with the early portions of such smaller PTSE storms may also be considered in the definition of the various alarm levels.

Referring again specifically to FIG. 7, if it is determined that enough alarms of sufficient severity to indicated a network congestion event have been generated in step 704, then the administrative computer 20 executes step 706. If not, then the administrative computer 20 returns to step 702 to continue monitoring alarms.

In step 706, the administrative computer 20 provides a notification to a human operator that a network event has been detected. The notification may simply be an indicator on a computer display, or may be a more pronounced display, such as a flashing signal lamp. The notification may occur on a number of media, including one or more computer displays, stand-alone indicator lamps, audible alarms and the like. The notification may be provided via a wireless system to pagers of one or more persons responsible or "on call" for the network 100. The network personnel may thereafter take corrective action, such as those outlined on FIG. 8 and discussed below.

It will be appreciated that the notification may also or alternatively be provided to another software operation that effectuates its own automated corrective action. Such a notification may occur completely within the administrative computer 20. It will also be appreciated that the administrative computer 20 may be configured to provide different notifications for different levels of congestion, and may even make available displays or files of alarm statistics even when the network 100 is not experiencing a network congestion event. Thus, step 706 merely emphasizes that the administrative computer 20 provides notification to another entity when the evidence of network congestion justifies remedial action.

Figure 8:
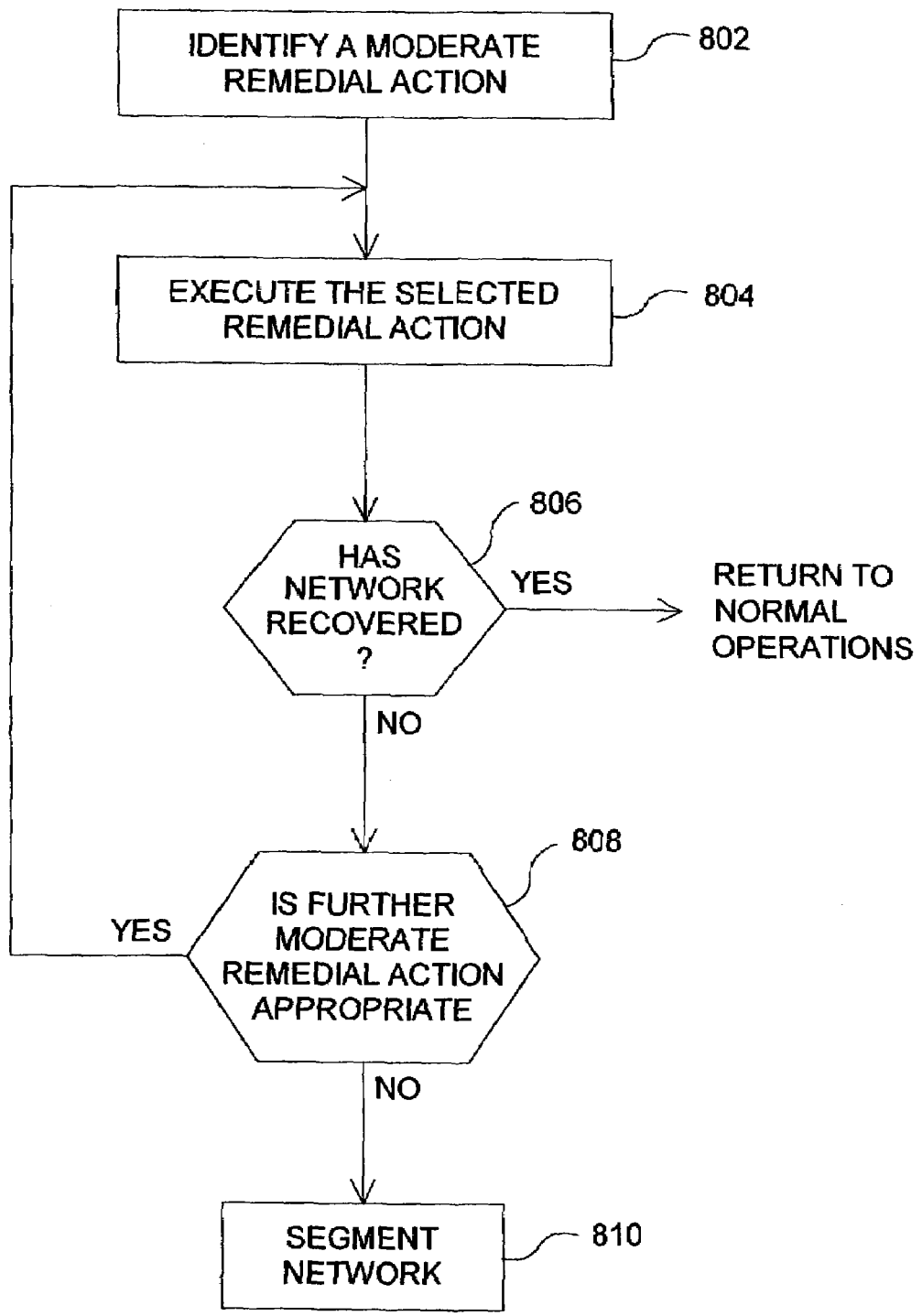
FIG. 8 shows a flow diagram of a disaster prevention technique in accordance with aspects of the present invention for use in connection with a scheduled network event.

FIG. 8 shows an exemplary set of operations that may be carried out in response to a notification of network congestion event. In general, the steps of FIG. 8 are primarily intended to reduce the likelihood that a congestion event will escalate into a failure of a substantial portion of the network 100. In some cases, as will be discussed below, the steps of FIG. 8 also, or alternatively, operate to reduce the severity of a network failure if network failure cannot be avoided. The steps of FIG. 8 may be carried out automatically, via software operation. However, because failure of network components and/or congestion of the network may prevent the communications necessary to effect automated action, at least some of the steps of FIG. 8 may be carried out manually.

Referring now specifically to FIG. 8, it will be appreciated that the operations of FIG. 8 presuppose that the existence of a network congestion event has been determined. As discussed above, a network congestion event is a condition which the network administrator has determined requires intervention to reduce severe congestion, prevent a total network failure, or reduce the severity of a failure.

In step 802, the network selects one of a plurality of moderate remedial actions based on a set of rules. By "moderate", it is meant that while the remedial action may result in reduced service, the action nevertheless results in most of the network 100 continuing to have full connectivity.

To this end, a rule base may be developed that obtains available statistics and determines what moderate remedial action(s) to attempt and the order in which such actions should be taken. Common remedial actions include troubleshooting individual nodes, isolating individual nodes, and reducing the number of trunks (i.e. adjacency) of one or more congested nodes.

For example, if it is clear that the high processor usage and/or high memory usage are being experienced by only a few nodes (less than three), then the remedial action may consist of troubleshooting those nodes. Alternatively, if a single node is creating too many PTSEs, then that node may be isolated from the rest of the network. When the node is isolated, its PTSEs cannot create congestion in the other nodes, and the rest of the network should recover. In another situation, if the source of the PTSE messages that are creating the congestion event are widespread, then the number of trunks connected to each node may be reduced. Reducing the number of trunks connected to each node alleviates congestion of control messages such as PTSEs because it reduces the number of times PTSEs must be copied and re-transmitted between network entities. Moreover, it reduces the number of entities on the network for which PTSEs need to be created.

The set of rules that are used in step 802 to identify a moderate remedial action may be defined in a software expert system, but need not be. Those of ordinary skill in the art should be able to develop a rule set consistent with the operations described above.

Thereafter, in step 804, the remedial action that was selected in step 802 is implemented. For example, software and/or manual techniques may be used to troubleshoot nodes, isolate a single node, and/or take down specific trunks.

In step 806, it is determined whether the network 100 has adequately stabilized or recovered within a specific time period. To this end, after some time, the administrative computer 20 performs the operations of FIG. 3 (or FIG. 7) to determine whether the measurement data continues to indicate the existence of a network congestion event. If not, the network 100 has recovered.

If it is determined that the network 100 has recovered, then the normal operations of the network 100 may occur. To this end, the administrative computer 20 may continue the operations of FIG. 3 (or FIG. 7) to monitor the network.

If it is determined that the network 100 has not recovered within the specified time period, then in step 808 it is determined whether it is appropriate to attempt another type of moderate remedial action. If so, then that remedial action is implemented in step 804 and the process continues accordingly. If, however, all reasonable and appropriate attempts at moderate remedial action have failed, then the network is segmented in step 810.

Network segmentation involves dividing the network 100 into two or more segments that are completely isolated from one another. Segmentation results in significant reduction of connectivity in the network, and should only be implemented when more moderate procedures have failed to mitigate the network congestion event. Segmentation is implemented because it greatly reduces the number of PTSEs to be handled in each resulting network segment as well as the number of times PTSEs and other control messages have to be generated and retransmitted. Moreover, if the PTSE storm ultimately cannot be mitigated prior to the failure of parts of the network 100, then segmentation can isolate the failure to one of the segments, allowing limited network service on the remaining segment(s).

In accordance with another aspect of the invention, a segmentation method is defined that may be used in the event of a severe network congestion event. The segmentation method endeavors to effect segmentation in a manner that reduces the negative impact of segmentation.

Figure 9:
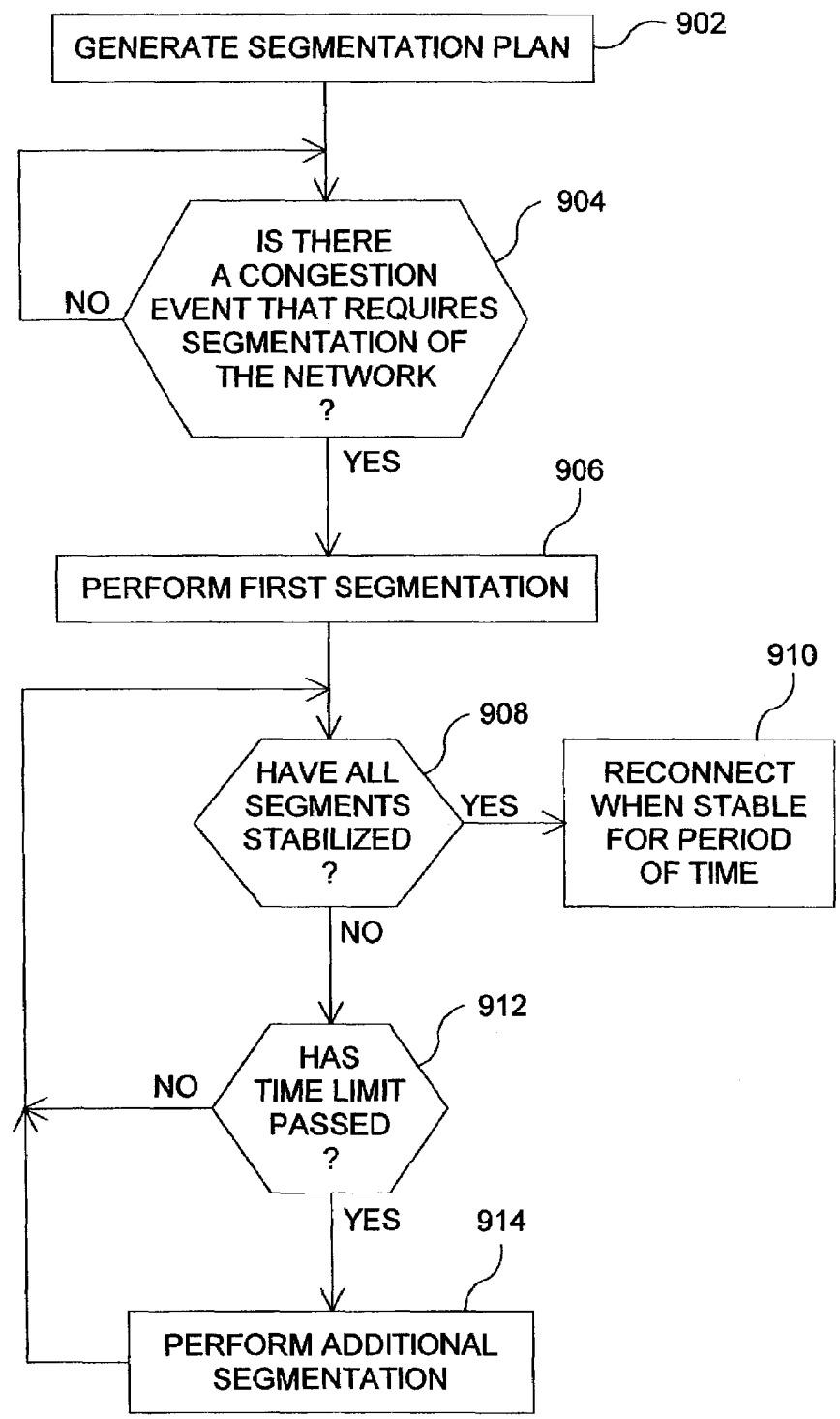
FIG. 9 shows a flow diagram of a network segmentation operation according to aspects of the present invention.

More specifically, FIG. 9 shows a flow diagram of an exemplary method for developing and implementing a segmentation plan for a data communication network. By way of example, the segmentation implementation method of steps 906-914 of FIG. 9 may be used as step 810 to segment the network 100 in the event of a major network event. However, the flow diagram of FIG. 9 shows a more general method of developing and implementing a segmentation plan that may be employed in many situations.

As discussed above, segmentation of a data network results in isolation of portions of the network, and therefore should only be employed in the event of a network event that cannot be mitigated by more moderate remediation techniques. The operations of FIG. 9 may be carried out at least in part by an administrative computer such as the administrative computer 20, or other processing devices that can carry out software applications within the network. In some cases, as discussed below, human intervention may be required to carry out some of the steps.

In step 902, a segmentation plan is generated. In particular, a processing device such as the administrative computer generates a segmentation plan that identifies how the network will be segmented. In particular, segmentation involves assigning the nodes to a select number of isolated network segments. In general, the segmentation plan is generated periodically, for example, every day, so that changes in the network may be considered in the segmentation plan. The segmentation plan in any event is preferably, but need not be, generated before the decision is made to actually implement the plan.

In general, the segmentation plan is generated in such a manner as to take into account the balancing of the sizes of the status databases maintained in the nodes of each resulting segment. In particular, as discussed above, the status databases (e.g. status database 37 of FIG. 2) store status update messages corresponding to each node and trunk on the network. Thus, the number of nodes and trunks in a segment affect the size of the status database that must be mounted in each node memory of the segment. The segmentation attempts to create a balance in the status database size of each network segment. The segmentation plan further takes into account the ease with which the segmentation may be implemented. Further detail regarding the development of the segmentation plan in step 902 is discussed below in connection with FIG. 10.

Figure 12:
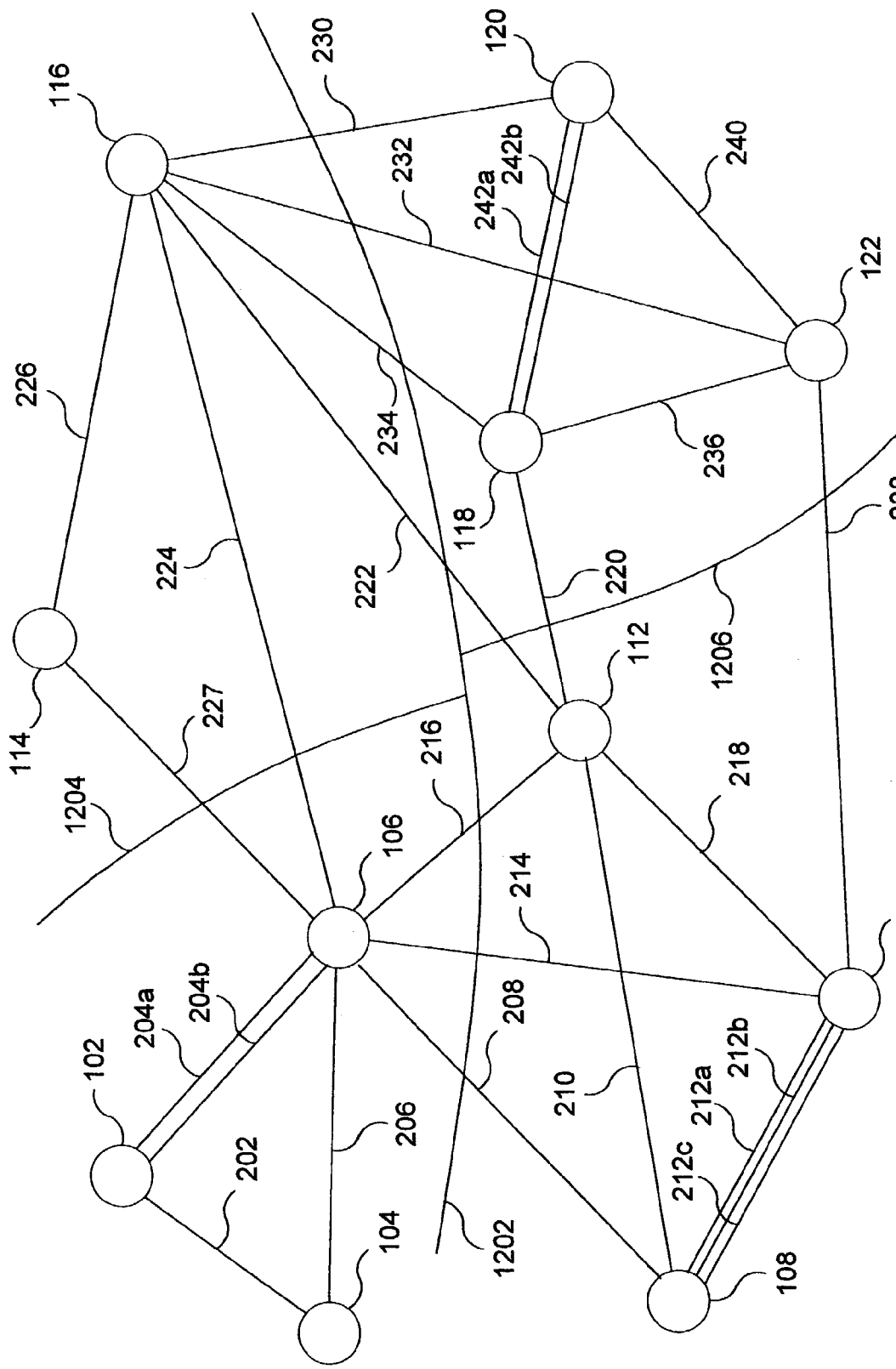
FIG. 12 shows the network area of FIG. 1 with defined segmentation boundaries.

The segmentation plan preferably involves multiple segmentation steps. For example, a first segmentation step may involve segmentation of the entire network into two subnetworks, while subsequent segmentation steps involve further segmentation of one or both of the subnetworks. By way of example, FIG. 12 shows a network topology map of the network 100 that illustrates potential segmentation boundaries 1202, 1204 and 1206. The segmentation boundaries 1202, 1204 and 1206 pass through the trunks that must be taken down in order to isolate the corresponding segments. The segmentation boundary 1202 represents the first segmentation step in which the network is divided into two subnetworks: a first subnetwork 1208 that includes nodes 102, 104, 106, 114 and 116; and a second subnetwork 1210 that includes nodes 108, 110, 112, 118, 120 and 122. The segmentation boundaries 1204 and 1206 represent subsequent segmentation steps that further subdivide the above described subnetworks. The subsequent segmentation steps represented by boundaries 1204 and 1206 are preferably executed independently of each other, depending on whether further segmentation is required in their respective subnetworks.

As discussed above, the segmentation plan is determined in step 902 based on a number of factors. One such factor is the balance of the status database size in the resulting segments. In other words, the segmentation plan is chosen such that number of status update messages that must be stored in the memories (e.g. node memory 32 of FIG. 2) of the nodes of both segments are largely equivalent. This balance tends to keep the maximum number of PTSEs in any one segment relatively small and hence the segments are more likely to stabilize. Another factor is the ease/cost associated with implementing the segmentation plan. In particular, in order to implement a segmentation such as dividing the network 100 along the boundary 1202, the trunks 208, 214, 216, 222, 230, 232 and 234 must be taken down. Some trunks are easier/cheaper to take down than others. The segmentation plan is selected to reduce as much as is practical the cost and/or difficulty (i.e. implementation time) associated with taking down the trunks necessary to implement the plan.

In many cases, trunks may be taken down remotely and automatically via software. For example, the administrative computer 20 at the node 106 may be able to take down the trunk 216 automatically, or may be able to send signals to the node 116 that cause a processor or computer at that node to take down the trunks 230, 232 or 234. In such cases, cost is not a significant factor. However, in other cases, trunks must be taken down manually, such as when congestion in the network makes transmission of control messages difficult, or when a node processor is inoperative due to malfunction. In these situations, the cost of taking down trunks can be considerable.

In particular, some trunks are located in offices that have significant technician coverage, such as 24 hour, 7 day coverage. In such offices, the cost of taking down trunks manually is minimal. Other offices have less technician coverage, and still others do not have any on-site technicians. The cost of manually taking down trunks in offices with little or no on-site coverage is significant.

To reduce the potential cost of implementing a segmentation plan and minimize the elapsed time required before the segmentation can be completed, the plan is chosen such that the trunks that need to be taken down are connected to a node within an office that has a high degree of coverage (24 hour, 7 day coverage). Accordingly, at least one criterion for reducing the cost/ease of implementing a segmentation plan is to choose a plan that takes down trunks connected to nodes that are subject to high levels of human technician coverage.

Figure 10:
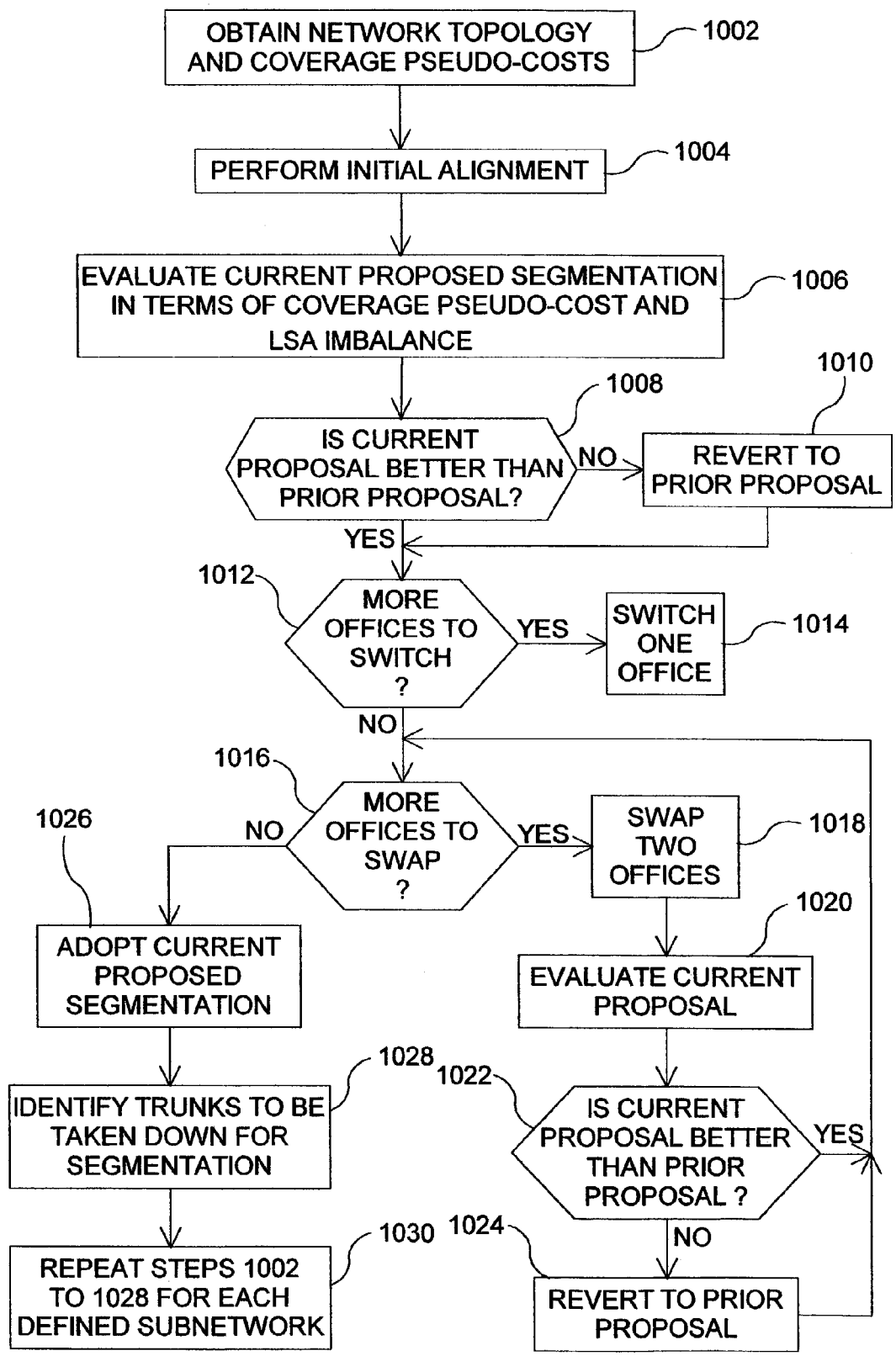
FIG. 10 shows a flow diagram of a set of operations for developing a segmentation plan for a network in accordance with aspects of the invention.

FIG. 10, discussed further below, describes an exemplary automated process for determining a segmentation plan in accordance with one aspect of the invention. As discussed above, the segmentation plan may be re-generated from time to time to take into account changes that occur to the structure of the network. In a preferred embodiment, the segmentation plan is developed every day. Thus, the operations of the FIG. 10 may be commenced anew every day.

Referring again specifically to FIG. 9, after the segmentation plan is adopted in step 902, general network operations may occur in step 904. During the course of general network operations, it may be determined that segmentation of the network, e.g. the network 100, is necessary. For example, a PTSE storm may be detected and various attempts to mitigate the storm may have failed. At such point, for example, in step 808 of FIG. 8, it may be determined that the drastic measure of segmentation is necessary. If so, then step 906 is performed. Absent such a determination, however, the network 100 would continue general operation in un-segmented fashion.

In step 906, a first segmentation operation is performed. To this end, the trunks that cross the defined segmentation boundary must be taken down. In other words, any trunk that connects a node of one network segment to a node of the other network segment must be taken down. The segmentation plan generated in step 902 generally defines both the trunks to be taken down, and the office from which they should be taken down. In general, an administrative computer such as the administrative computer 20 of the node 106 attempts to take down the trunks remotely. As discussed above, however, in many cases it will not be possible to take down the trunks automatically and/or remotely. Specifically, during an PTSE storm, node processors and/or communication links necessary to communicate and execute the segmentation plan may not be responding. In such cases, the administrative computer 20 with or without human assistance notifies technicians responsible for the affected nodes that the trunks must be taken down. The technician may then take down the trunks manually.

Consider an exemplary segmentation plan in which the first segmentation divides the network 100 at the boundary 1202 of FIG. 12 into the first subnetwork 1208 and the second subnetwork 1210. To execute the first segmentation of step 906, the administrative computer 20 attempts to send a message to the node processor 28 of node 106 (See FIG. 2) that causes the node processor 28 to take down the trunks 208, 214 and 216, and further attempts to send a message to the node processor of the node 116 that causes that node processor to take down the trunks 222, 230, 232 and 234. If the administrative computer 20 cannot cause the node processor at node 106 and/or the node processor at node 116 to take down their respective trunks, then the administrative computer 20 causes technicians at those nodes to be contacted with instructions to take down the trunks.

In step 908, it is determined whether the two isolated subnetworks have stabilized. To this end, one or more administrative computers (or other computers) obtain measurements from the subnetworks to determine whether the PTSE storm is subsiding. For example, the methods described in FIGS. 3-7 may be used to obtain a measurement of the congestion event for each subnetwork. The measurement information for each subnetwork may suitably be communicated to one or more administrative computers which, in turn, determine whether a congestion event is still occurring.

If the operations of FIGS. 3-7 for a particular subnetwork identify that the subnetwork is no longer experiencing a congestion event, then the subnetwork has stabilized. If, however, the operations of FIGS. 3-7 on that subnetwork identify that the subnetwork continues to experience a congestion event, then that subnetwork has not stabilized. Depending on the severity and location of the fault in the network 100, the first segmentation of step 906 can result in stabilization of both, none, or only one of the subnetworks.

Figure 11:
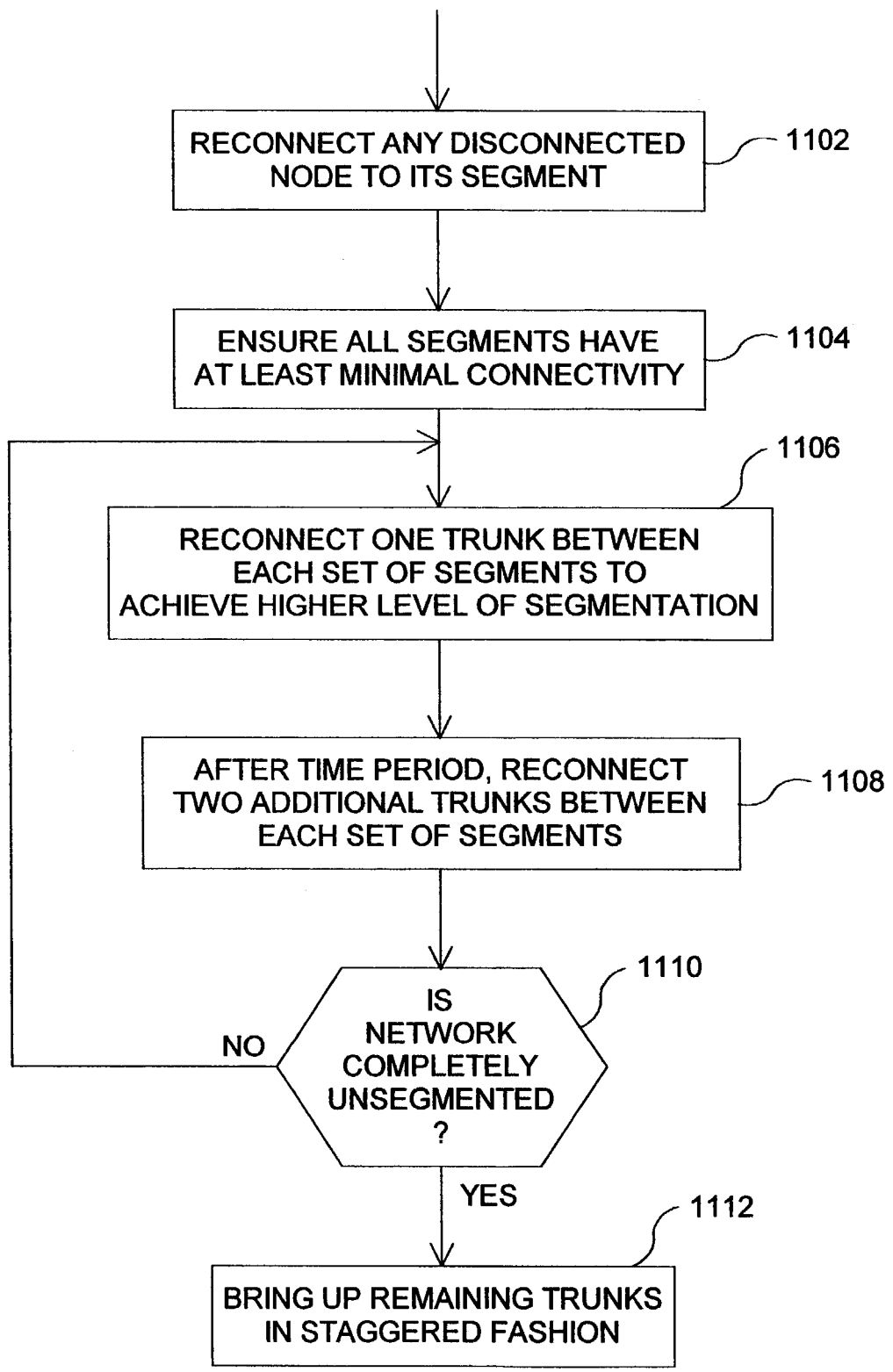
FIG. 11 shows a flow diagram of a network reconnection operation according to aspects of the present invention.

If, in step 908, it is determined that all of the subnetworks have stabilized, then in step 910 the subdivided network is eventually reconnected. In general, the subdivided network is only reconnected if it can remain stabilized for a certain period of time. In addition, the network is preferably reconnected in discrete steps to avoid creating a new PTSE storm. FIG. 11, discussed further below, shows an exemplary network reconnection method that may be used in carrying out step 910.

Referring again generally to step 908, if it is determined that at least one subnetwork has not stabilized, then in step 912 it is determined whether a certain time period has passed since the segmentation operation. If not, then the step 908 is repeated. If, however, a sufficient waiting period (e.g. thirty minutes) has passed and at least one subnetwork has not stabilized, then an additional segmentation is performed in step 914.

In step 914, any subnetwork that has not stabilized is further segmented in accordance with the predefined segmentation plan. For example, consider the exemplary segmentation plan illustrated in FIG. 12 and discussed above. If the second subnetwork 1210 comprising nodes 108, 110, 112, 118, 120 and 122 remains congested, then that subnetwork may be further segmented at the boundary 1206 of FIG. 12. Similarly, if the first subnetwork 1208 comprising nodes 102, 104, 106, 114 and 116 remains congested, then that subnetwork may be further segmented at the boundary 1204 of FIG. 12. Only those subnetworks or segments that remain congested are further segmented.

After the subsequent segmentation in step 914, step 908 is repeated to determine whether the further segmentation has resulted in all of the segments settling. If so, then reconnection may occur in step 910 in the manner discussed further above.

Thus, the method described above in connection with FIG. 9 provides a progression of segmentation that only segments the network to the extent necessary to settle the network. For example, the above method allows the network to be segmented only once if a single segmentation is sufficient to stabilize the network. Moreover, only those segments that remain unstable are further segmented. It will be appreciated that the segmentation plan may readily be modified to define any number of possible subdivisions.

FIG. 10 shows an exemplary process for defining a segmentation plan in accordance with are aspect of the present invention. It will be appreciated that while the segmentation plan generating operation of FIG. 10 is particularly advantageous, at least some of the benefits of the segmentation operation of FIG. 9 may be achieved even if the segmentation plan is generated using a different method.

Referring now to FIG. 10, the steps of FIG. 10 may suitably be performed by a processor that has access to network information. In the exemplary embodiment described herein, the administrative computer 20 of FIG. 2 performs the operations of FIG. 10.

In step 1002, the administrative computer 20 obtains the network topology and a pseudo-cost value associated with coverage of the various nodes or switching offices. The network topology information identifies the nodes of the network, the trunks that connect the various nodes, and the "offices" in which nodes are located. An office is a physical location in which one or more nodes may be located. In many cases, a single node is located in an office. However, in other cases, such as in large metropolitan areas, a single office may include several nodes. For example, the nodes 108 and 110 may be located within a single office. In the exemplary embodiment described herein, it is assumed that the following offices exist and contain the following nodes:

TABLE 1

| Office | Node(s) | Coverage Pseudo Cost |
|---|---|---|
| 1 | 102 | 1 |
| 2 | 104 | 2 |
| 3 | 106 | 2 |
| 4 | 108, 110 | 0 |
| 5 | 112 | 2 |
| 6 | 114 | 1 |
| 7 | 116 | 0 |
| 8 | 118, 122 | 1 |
| 9 | 120 | 3 |

The pseudo-cost information identifies a measure of economic cost and/or opportunity (time) cost associated with obtaining technician assistance or coverage at a particular office. As discussed above in connection with step 906, segmentation may require technicians to manually take down trunks at remote offices. The coverage pseudo-cost identifies the amount of difficulty in obtaining technician assistance in carrying out the segmentation plan at a particular office. For example, if Office No. 4 has full technician coverage (i.e. a technician is present at the office twenty-four hours, seven days a week), then the coverage pseudo-cost is 0 because someone is always available. As the actual coverage decreases, the coverage pseudo-cost rises. Thus, for example, an office that has no on-site coverage may have a pseudo-cost of 5 while a site that has twenty-four hour coverage five days a week may have a coverage pseudo-cost of 1.

Once the administrative computer 20 has these values, the administrative computer 20 proceeds to step 1004. In step 1004, the administrative computer 20 generates an initial allocation of the offices (and, as a result, nodes) to proposed subnetworks. The initial assignment may suitably be an arbitrary assignment of half or nearly half of all offices to each proposed subnetwork.

In step 1006, the administrative computer 20 evaluates the current proposed segmentation allocation. To this end, the administrative computer 20 determines the resulting total pseudo-cost for the proposed allocation, and also evaluates the balance of the status database sizes between the proposed subnetworks.

The balance of status database sizes between subnetworks may typically be determined based on the proposed assignment of offices. In particular, the assignment of offices to segments implies the assignment of each node to a segment (see Table 1). Furthermore, the assignment of trunks to segments is also implied: if the nodes at both ends of a trunk are in the same segment, the trunk is assigned to that segment; otherwise, the trunk is identified as one which must be taken down in order to implement the segmentation. Thus, the number of nodes and trunks in each segment is easily determined, and a function of these values is used as an estimate of the number of status update messages that are stored in the status databases of the nodes memories in each segment. Once the number of status update messages stored in the status databases are known for each proposed segment, the difference between those numbers provides a measure of the balance of the status database size of the proposed segments.

For example, in many situations the nodal PTSEs and horizontal link PTSEs comprise of the majority of the PTSEs. The total number of nodal and link PTSEs may readily be determined because there is one nodal PTSE per node and two horizontal link PTSEs per trunk. Thus, the status database (e.g. status database 37 of node 106) of the nodes of a segment would contain one PTSE for each node assigned to the segment and two PTSEs for each trunk assigned to the segment. The status database size for each segment may then be estimated from that total number of PTSEs.

In the exemplary embodiment described herein, the balance of the number of PTSEs is expressed as an imbalance number. The imbalance number is calculated as the difference between the maximum and minimum numbers of status update messages or PTSEs that would be stored in the status database of the node memories in the proposed subnetworks. For example, if the subnetwork with the maximum number of PTSEs to be stored has 50 PTSEs and the subnetwork with the minimum number of PTSEs to be stored has 40 PTSEs, then the imbalance number is 10.

The total coverage pseudo-cost for a given segmentation is the cumulative pseduo-cost for the offices that need to be contacted in order to implement the segmentation. As discussed above, the coverage pseudo-cost for an office quantifies the time and/or economic cost associated with manually taking down trunks from that office. Thus, once the set of trunks that must be taken down is identified in the proposed segmentation, a least cost set of offices to use to implement the segmentation must be determined. This is equivalent to finding the least cost set of offices such that each trunk that must be taken down terminates in at least one of the offices in the set. Optimization tools or heuristics may be used to solve this problem. The cumulative coverage pseudo-costs from the least cost set of offices represents the total coverage pseudo-cost for the proposed segmentation.

For example, consider an initial allocation in which the proposed segmentation occurs along the boundaries 1204 and 1206 (i.e. not boundary 1202), such that nodes 102, 104, 106, 108, 110 and 112 (i.e. offices 1, 2, 3, 4 and 5) are located in a first proposed subnetwork, and nodes 114, 116, 118, 120 and 122 (i.e. offices 6, 7, 8 and 9) are located in a second proposed subnetwork. First, the status database size balance is measured by calculating the number of nodal and horizontal link PTSEs on each proposed subnetwork. Thus, if it is assumed that the first proposed subnetwork has 30 nodal and horizontal link PTSEs and the second proposed subnetwork has 21 nodal and horizontal link PTSEs, then the imbalance number will be 9. Second, the total pseudo-cost of the proposed segmentation is calculated. It is noted that the segmentation may be accomplished through nodes 106, 110 and 112, which are located in Office Nos. 3, 4 and 5, or through nodes 110, 112, 114 and 116, which are located in Office Nos. 4, 5, 6 and 7, among other choices. As discussed above, each office has a pseudo-cost. Thus, the lesser of the sum of the pseudo-costs associated with Office Nos. 3, 4 and 5 and the sum of the pseudo-costs associated with Office Nos. 4, 5, 6, and 7 represents a better possible total coverage pseudo-cost for the proposed segmentation. Referring to table 1, the better total coverage pseudo cost is 3, which results from contacting offices 4, 5, 6, and 7.

Thus, once the evaluation is completed in step 1006, the proposed segmentation has associated with it a total coverage pseudo-cost and an imbalance number. Thereafter, in step 1008, the administrative computer 20 determines whether the current proposed segmentation is a better option than the prior proposed segmentation. If so, then the current proposed segmentation is retained and the administrative computer 20 proceeds to step 1012. If not, however, then the current proposed segmentation is discarded and the prior proposed segmentation is restored as the current proposed segmentation in step 1010. After step 1010, the administrative computer 20 proceeds to 1012. It is noted that for the initial allocation, the current proposed segmentation is always retained because there is no prior proposed segmentation.

To determine whether the current proposed segmentation is a better option than the prior proposed segmentation, the administrative computer 20 compares the imbalance number and the coverage pseudo-cost of both proposed segmentations. If the current proposed segmentation has both a lower imbalance number and lower coverage pseudo-cost, then the current proposed segmentation is the better option. If the current proposed segmentation has a higher imbalance number and a higher coverage pseudo-cost, then the current proposed segmentation is not the better option. If the current proposed segmentation does not improve the balance, but provides a lower coverage pseudo-cost, then the current proposed segmentation is a better option, provided that the imbalance number is lower than a predefined threshold, for example, 5% of the number of PTSEs in the original full network. Moreover, if the current proposed segmentation does not increase the coverage pseudo-cost, but provides a better balance, then the current proposed segmentation is a better option.

It will be appreciated that modifications to the selection determination between the prior proposed segmentation and the current proposed segmentation may be made by those of ordinary skill in the art to suit their implementation needs. In other words, other criteria may be used to evaluate the proposed segmentations, and/or the imbalance number and coverage pseudo-costs may be weighted differently.

In any event, the administrative computer 20 thereafter performs multiple iterations of proposed segmentations, each of which involves the movement of one office from its existing subnetwork assignment to the other subnetwork assignment. Each resulting proposed segmentation is then evaluated. More specifically, in step 1012, the administrative computer 20 determines whether there are any additional offices that can be moved. In other words, the administrative computer 20 determines whether all iterations involving the movement of one office have been evaluated. If there are no more offices that have not already been moved, then the administrative computer 20 proceeds to step 1016 to perform a new set of iterations, as discussed further below in detail.

However, assuming that all iterations involving the movement of one office have not been attempted, then the administrative computer 20 in step 1014 selects a different office to switch from its current subnetwork assignment. For example, given the above example in which offices 1, 2, 3, 4 and 5 are located in a first proposed subnetwork and nodes 6, 7, 8, and 9 are located in a second proposed subnetwork, the administrative computer 20 in step 1014 may move office 1 to the second proposed segment. The current proposed segmentation then becomes the prior proposed segmentation and the segmentation that results from the move in step 1014 becomes the current proposed segmentation.

Once the new current proposed segmentation is defined in step 1014, the administrative computer 20 returns to step 1006 and proceeds as described above to evaluate the current proposed segmentation and determine if it is a better choice. If not, the prior proposed segmentation is restored as the current proposed segmentation (step 1010).

Referring again to step 1016, steps 1016 to 1024 represent an additional set of iterations in which pairs of offices from different proposed segments are swapped. Accordingly, in step 1016, the administrative computer 20 determines whether any more pairs of offices may be swapped. If so, then the administrative computer 20 proceeds to step 1018. If not, or in other words, if all iterations involving switching a pair of offices from different proposed segments have been evaluated, then the administrative computer 20 proceeds directly to step 1026. Assuming that all iterations have not yet been evaluated, then in step 1018, a set of two offices, one from each current proposed subnetwork, are swapped.

For example, assuming that the first subnetwork includes offices 1, 2, 3, 4 and 5 and the second subnetwork includes offices 6, 7, 8 and 9, the administrative computer 20 may swap office 1 and office 6 such that the proposed first subnetwork would include offices 2, 3, 4, 5 and 6 and the proposed second subnetwork would include offices 1, 7, 8 and 9.

In any event, after step 1018, the existing proposed segmentation becomes the prior proposed segmentation and the new proposed allocation of offices (including the swap) becomes the current proposed segmentation. The administrative computer 20 thereafter proceeds to step 1020.

In step 1020, the administrative computer 20 evaluates the current proposed segmentation in a manner substantially identical to that described above in connection with step 1006. After step 1020, the administrative computer 20 proceeds to step 1022. In step 1022, the administrative computer 20 determines whether the current proposed segmentation is a better choice than the prior proposed segmentation. To this end, the administrative computer 20 may suitably employ the same determination operations as those described above in connection with step 1008. If the current proposed segmentation is a better option than the prior proposed segmentation, then the administrative computer 20 retains the current proposed segmentation and then returns to step 1016. If the current proposed segmentation is not a better option, then the administrative computer 20 discards the current proposed segmentation and retains the prior proposed segmentation as the current proposed segmentation in step 1024. After step 1024, the administrative computer returns to step 1016.

Step 1026, as discussed above, is executed once all swapping iterations have been evaluated in steps 1016 to 1024. In step 1026, the administrative computer 20 adopts the current proposed segmentation as the first segmentation step in the segmentation plan. Thereafter, the administrative computer 20 in step 1028 determines the trunks that are to be taken down to effect the first segmentation step described above. The trunks that are to be taken down are the ones that connect the first subnetwork to the second subnetwork. The trunks are to be taken down from the offices on the subnetwork that have a lower total coverage pseudo-cost.

Thus, if the first segmentation step of the segmentation plan defines a first subnetwork that includes offices 1, 2, 3, 6 and 7 and a second subnetwork that includes offices 4, 5, 8 and 9, then trunks 208, 214, 216, 222, 230 and 232 and 234 must be taken down. Such trunks may be taken down from office 3 (node 106) and office 7 (node 116). (Alternatively, the trunks could be taken down by offices 4, 5, and 7 at the same cost, achieving a better balance across offices of the work to be done to implement the segmentation.) The list of trunks to be taken down define the first segmentation step because taking down those trunks actually effectuates the separation or segmentation.

After step 1028, the administrative computer 20 proceeds to step 1030. In step 1030, the administrative computer 20 repeats the process described above for each subnetwork defined by the adopted first segmentation step. For example, if as a result of the operations of steps 1004-1028 the first segmentation step of the segmentation plan defines the first subnetwork 1208 that includes offices 1, 2, 3, 6 and 7 and the second subnetwork 1210 that includes offices 4, 5, 8 and 9, then in step 1030, the administrative computer 20 performs steps 1004-1028 of FIG. 10 separately for each of the first and second subnetworks to determine a subsequent set of segmentation operations for each subnetwork. For example, the subsequent segmentation steps define segmentation of the first subnetwork 1208 at the boundary 1204 and segmentation of the second subnetwork 1210 at the boundary 1206. As a result of step 1030, a segmentation plan has been defined that progressively segments the network 100 into two, and then three of four parts.

The above described operations may theoretically be repeated to define additional steps that can further subdivide the network segments. However, in the exemplary embodiment described herein, the segmentation plan defines a first segmentation step that divides the network 100 into first and second subnetworks 1208 and 1210, respectively, and subsequent segmentation steps that divide each of the first subnetwork 1208 and the second subnetwork 1210 into two segments.

As discussed above in connection with FIG. 9, it is possible that the segmentation of the network 100 into the first and second subnetworks 1208 and 1210, respectively, will be sufficient to stabilize the network 100. However, it is also possible that only one of the two subnetworks will stabilize. In such an event, the unstabilized subnetwork may require further segmentation as defined in the segmentation plan, while the stabilized subnetwork is left intact. In yet other situations, neither the first nor second subnetwork will stabilize and both subnetworks will require further segmentation. The segmentation plan developed by the operations of FIG. 10 merely describes a methodology in which the network 100 may be divided into segments in a progressive manner, once the need to perform the segmentation arises.

An issue related to segmentation is the graceful reconnection of the segments and/or subnetworks after they have stabilized. As discussed above in connection with step 910 of FIG. 9, segments of the segmented network 100 may be reconnected after they exhibit stability for a sufficient amount of time. Reconnection of the segments, however, must be done carefully to avoid setting off another congestion event. In particular, as network elements are reconnected, PTSEs are created to announce the new connectivity. Accordingly, care must be taken not to cause the creation and distribution of a large enough number of PTSEs to lead to another congestion event.

FIG. 11 shows an exemplary set of operations that may be performed once the decision to reconnect segments of the network has been made following a segmentation operation. As with the operations of FIG. 9, the steps are preferably carried out by one or more computers, but may require manual, local human operation in some cases. In particular, any trunks that were manually taken down by disconnecting them from a node must be manually reconnected.

It will be appreciated that after segmentation in accordance with the operations of FIG. 9, the network 100 may be divided into two, three or four segments. In general, the operations of FIG. 11 start by reconnecting the smallest segments of the network. Once the smaller segments have been combined to reestablish the larger subnetworks, the steps of FIG. 11 are repeated to reconnect the larger subnetworks (i.e. the first subnetwork 1208 and the second subnetwork 1210) to restore the network 100. In the event that the network 100 has been divided into four segments (i.e. the first subnetwork 1208 was divided into two segments and the second subnetwork 1210 was divided into two segments), the steps of FIG. 11 may be performed contemporaneously restore the first and second subnetworks independently of each other.

As an initial step 1102, any switch (i.e. node) that is disconnected from its segment or subnetwork should be reconnected. In particular, the segmentation operations of FIG. 9 may have been coupled with other remedial or diagnostic operations, such as the disconnection of individual nodes. The first step to reconnecting a segmented network is to reconnect any node that was disconnected from its respective segment or subnetwork, assuming the node is functioning properly.

For example, one of the remedial actions (step 804 of FIG. 8) taken prior to segmentation (step 810 of FIG. 8) may have been to disconnect node 120 from the network 100. Thereafter, the network 100 may have been segmented into the first and second subnetworks (along boundary 1202)

described above and subsequently stabilized. In such a case, the first step of reconnection is to reconnect the node 120 to the second subnetwork 1210.

Thereafter, in step 1104, each segment should be analyzed for connectivity within the segment. This is necessary because although the segmentation plan ensures that each segment has connectivity if only those trunks identified by the plan are taken down, additional trunks may have been taken down as a remedial measure (step 804 of FIG. 8). Taking down those other trunks could have resulted in the segment not being fully connected. Because the segmentation plan is developed prior to the network congestion event, implementation of the segmentation plan is performed without regard to any trunks that may be taken down for other reasons. Accordingly, one segment may actually be unintentionally divided into two or more small subsegments. In step 1104, the connectivity within the segments are restored if such a division has occurred.

In step 1106, a single trunk between the two segments (or subnetworks) is reconnected. Consider an example in which the network 100 is only divided into the two subnetworks 1208 and 1210. In such an example, a single trunk crossing the boundary 1202, such as trunk 220, is reconnected in step 1106.

In general, the trunk that connects the nodes with the highest adjacencies is selected. Thus, in the above example, the trunk 216 is reconnected or brought up first because node 106 (first subnetwork 1208) and node 112 (second subnetwork 1210) have the highest adjacencies.

The trunk connecting the nodes with the highest adjacencies is chosen because it reduces the impact of the PTSE storm created by the reconnection of the segments. Because there is not always a trunk that connects the nodes with the highest adjacencies of both subnetworks or segments, a trunk should be chosen that maximizes the sum of the adjacencies of the two nodes being connected.

In any event, after step 1106, a brief time period is allowed to pass to allow for the initial PTSE (i.e. status update) message flooding to occur. As discussed above, the reconnection of the segments, even over a single trunk, will cause a number of PTSEs to be created and propagated. Step 1106 provides some time to allow these PTSEs to propagate. After this delay, two additional trunks are connected between the same segments being connected in step 1108. Accordingly, after step 1108, a total of three trunks connect the two segments.

In step 1110, it is determined whether the network has been completely unsegmented. In other words, it is determined whether the prior executions of steps 1106 and 1108 reconnected the network, or merely reconnected segments to form two or three subnetworks. If the network has been completely unsegmented, then the process proceeds to step 1112. If however, the network is still divided, for example, into two unconnected subnetworks, then the process of reconnecting the subnetworks occurs by returning to step 1106 and proceeding accordingly.

Once it is determined in step 1110 that the network has been unsegmented, then in step 1112 any additional trunks of the network that were brought down may be brought up. The remaining trunks should be reconnected in staggered fashion, again to avoid creating a large PTSE storm.

As a consequence, the above described inventive aspects describe methods for monitoring a network for a network congestion event, attempting to remedy an impending or occurring network congestion event, segmenting a network in a severe congestion event, developing a segmentation plan, and furthermore reconnecting a network after a congestion event. Each inventive aspect provides at least some advantages independent of the other inventive aspects. Accordingly, those of ordinary skill in the art may obtain at least some of the advantages of the inventive aspects described herein by adopting only one or more of the inventive methods described above.

Figure 13:
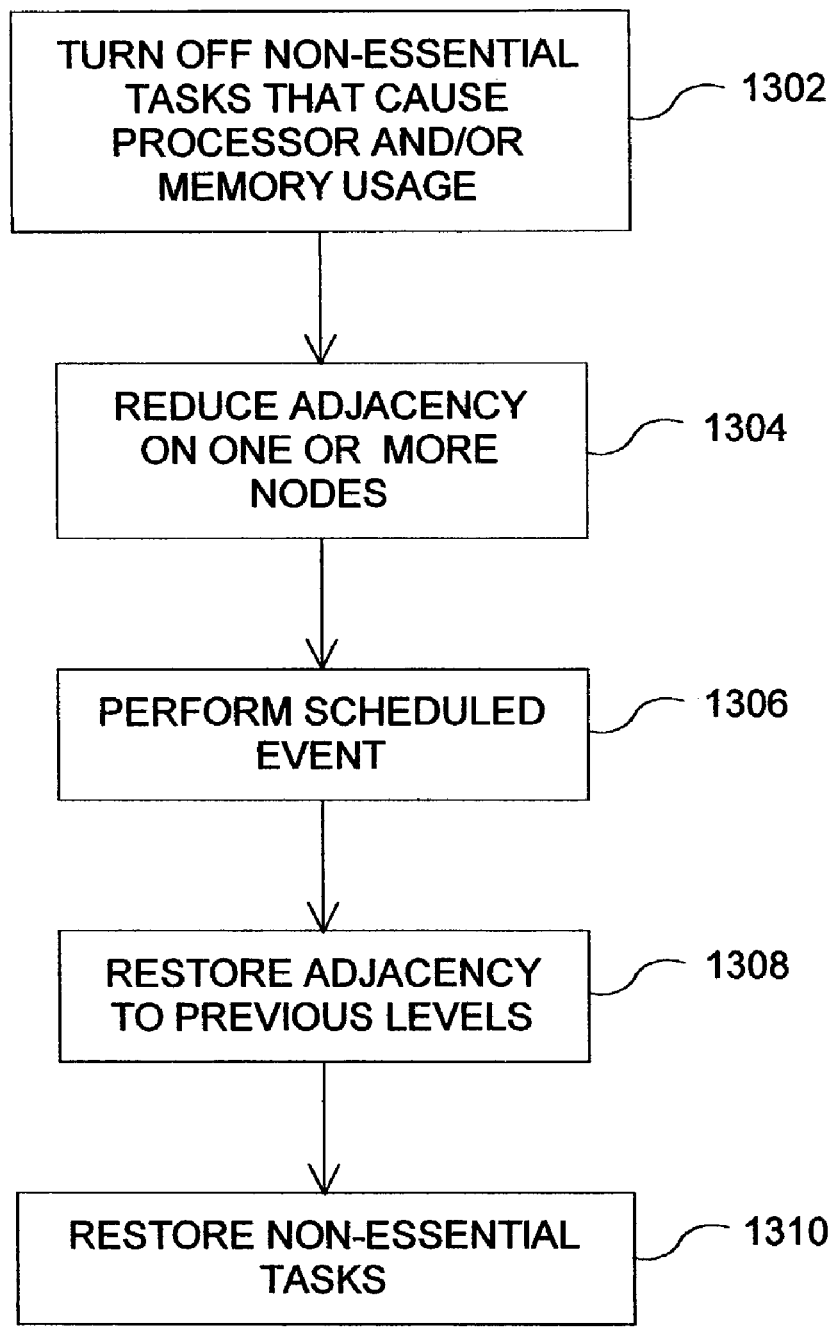
FIG. 13 shows a flow diagram of a set of operations for preparing a network for a scheduled event that could result in network congestion.

An additional inventive aspect relates to performing precautionary measures to avoid a network congestion event or at least reduce congestion formed by status update messages during a scheduled network event. In particular, as discussed further above, it is sometimes necessary to bring down a set of trunks or nodes of the network for diagnostics or the like, or to perform a software upgrade. Because bringing down network entities results in the creation of PTSEs to notify the other elements of the network, there is a danger that such a scheduled network event could set off a PTSE storm that results in a network congestion event requiring major remedial measures. FIG. 13 shows an exemplary method for preparing a network, for example, the network 100, for a scheduled network event that involves bringing down trunks and or nodes.

Typically, the steps of FIG. 13 may be carried out at an administrative computer, that has the capability to communicate instructions to various node processors on the network. While other processing devices may be used to carry out the steps of FIG. 13, it is assumed that the administrative computer 20 of FIG. 2 carries out the operations of FIG. 13 in the exemplary embodiment described herein.

In step 1302, the administrative computer 20 causes the node processors of the various nodes of the network 100 to turn off any non-essential tasks. A non-essential task is one that does not prevent the node from transporting data packets. Such non-essential tasks in a typical network may include finding more efficient routes for data packets or non-critical routine maintenance. The purpose of shutting off the non-essential tasks is to reduce the load on the node processors so that the node processors are less likely to overload in the event of a PTSE storm.

Thereafter, in step 1304, the administrative computer 20 causes one or more trunks to be taken down to reduce adjacency at nodes that have high adjacencies. For example, in the network 100, the administrative computer 20 may cause one or more trunks connected to nodes 106, 110 and 116 to be taken down. The nodes with the highest adjacencies are selected in order to reduce the load on the node processors at those nodes. Care must be taken to ensure that the network 100 can carry the required traffic after the trunks are taken down.

Once the non-critical tasks of the node processors and the adjacencies of the highest adjacency nodes are reduced, the scheduled network event is performed in step 1306. The scheduled network event includes taking down or operably removing one or more nodes and/or trunks from the network. Because a set of nodes and/or trunks are taken down during the scheduled network event, several PTSEs are created to update the remaining nodes of the change, as well as other events that may fall out from the change. In accordance with one aspect of the invention, the above steps 1302 and 1304 help reduce the possibility that any node processor will become overloaded (i.e. 100% busy for an extended period of time), thereby reducing the propagation of the PTSE storm. In particular, without the operations of step 1302 and 1304, one or more node processors may become overloaded, thereby potentially causing more PTSEs to be created for multiple reasons.

In any event, once the scheduled network event has been performed in step 1306, the administrative computer 20 in step 1308 causes the adjacencies to be restored to previous levels. Similarly, in step 1310, the administrative computer 20 causes the non-essential tasks to be restored at the node processors.

It will be appreciated that the above described embodiments are merely illustrative, and that those of ordinary skill in the art may readily devise their own implementations and adaptations that incorporate the principles of the present invention and fall within the spirit and scope thereof.

We claim:

1. A method of monitoring a network, the network including a number of nodes interconnected by trunks, comprising:
    obtaining processor usage data pertaining to a plurality of node processors, the processor usage data including information representative of a rate of usage of each of the plurality of node processors;
    obtaining memory usage data pertaining to a plurality of memories, each of the plurality of memories associated with a node processor, the memory usage data including information representative of a level of usage of each of the plurality of memories;
    obtaining a status update message rate, the status update message rate identifying a rate at which status update messages are generated, the status update messages each comprising an information message identifying an update in status of a network entity; and
    determining from the memory usage data, the processor usage data and the status update message rate whether a network congestion event is occurring.

2. The method of claim 1 further comprising providing a notification responsive to determining that a network congestion event is occurring.

3. The method of claim 1 further comprising performing a corrective action in the network responsive to determining that a network congestion event is occurring.

4. The method of claim 1 wherein the network is an asynchronous transfer mode network and the status update messages comprise PTSE messages.

5. The method of claim 1 wherein the network is an Internet Protocol network and the status update messages comprise LSA messages.

6. The method of claim 1 wherein said determining whether the network congestion event is occurring further comprises:
    generating one or more processor usage alarms based on the processor usage data for each node processor in the event that the processor usage data identifies a usage level for the processor that exceeds at least one of a plurality of processor alarm thresholds; and
    determining whether a network congestion event is occurring based at least in part on the one or more generated processor usage alarms.

7. The method of claim 1 wherein said determining whether the network congestion event is occurring further comprises:
    generating one or more memory usage alarms based on the memory usage data for each memory in the event that the memory usage data identifies a usage level for the memory that exceeds at least one of a plurality of memory alarm thresholds; and
    determining whether a network congestion event is occurring based at least in part on the one or more generated memory usage alarms.

8. A system for determining whether a network congestion event is occurring in a network, comprising:
    a processor arrangement comprising one or more operably connected processors, the processor arrangement operable to
    obtain at least one of processor usage data, memory usage data, and status update message rate data, the processor usage data including information representative of a rate of usage of each of a plurality of node processors, the memory usage data including information representative of a level of usage of each of a plurality of memories, each of the plurality of memories associated with a node processor, the status update message rate identifying a rate at which status update messages are generated, the status update messages each comprising an information message identifying an update in status of a network entity;
    determine from the at least one of processor usage data, memory usage data, and status update message rate data whether a network event is occurring; and
    change the state of a variable responsive to determining that a network congestion event is occurring.

9. The system of claim 8 wherein the processor arrangement includes a first processor operably connected to receive the at least one of processor usage data, memory usage data, and status update message rate data from a remote processing device.

10. The system of claim 8 wherein the processor arrangement is further operable to:
    obtain each of processor usage data, memory usage data, and status update message rate data; and
    determine from the obtained processor usage data, memory usage data, and status update message rate data whether a network event is occurring.

11. The system of claim 8 wherein the processor arrangement is further operable to determine whether the network congestion event is occurring further by:
    generating one or more processor usage alarms based on the processor usage data for each node processor in the event that the processor usage data identifies a usage level for the processor that exceeds at least one of a plurality of processor alarm thresholds; and
    determining whether a network congestion event is occurring based at least in part on the one or more generated processor usage alarms.

12. The system of claim 11 wherein the processor arrangement is further operable to determine whether the network congestion event is occurring further by:
    generating one or more memory usage alarms based on the memory usage data for each memory in the event that the memory usage data identifies a usage level for the memory that exceeds at least one of a plurality of memory alarm thresholds; and
    determining whether a network congestion event is occurring based at least in part on the one or more generated memory usage alarms.

13. The system of claim 8 wherein the processor arrangement is further operable to determine whether the network congestion event is occurring further by:
    generating one or more memory usage alarms based on the memory usage data for each memory in the event that the memory usage data identifies a usage level for the memory that exceeds at least one of a plurality of memory alarm thresholds; and
    determining whether a network congestion event is occurring based at least in part on the one or more generated memory usage alarms.

14. The system of claim 8 wherein the processor arrangement includes at least one node processor.

15. The system of claim 8 wherein the processor arrangement includes a first processor operably coupled to communicate with the plurality of node processors.

16. The system of claim 8 wherein the processor arrangement includes a plurality of processors interconnected via the network.

17. A method of monitoring a network, the network including a number of nodes, comprising:

obtaining processor usage alarm data pertaining to a plurality of node processors, the processor usage alarm data including information representative of one of a plurality of alarm conditions based on a rate of usage of each of the plurality of node processors;

obtaining memory usage alarm data pertaining to a plurality of memories, each of the plurality of memories associated with a node processor, the memory usage alarm data including information representative of one of a plurality of alarm conditions based on a level of usage of each of the plurality of memories;

obtaining a status update message rate, the status update message rate identifying a rate at which status update messages are generated, the status update messages each comprising an information message identifying an update in status of a network entity; and determining from the memory usage alarm data, the processor usage alarm data and the status update message rate whether a network congestion event is occurring.

18. The method of claim 17, wherein the plurality of alarm conditions based on the rate of usage of each of the plurality of processors includes first, second and third alarm conditions, and wherein:

determining whether a network congestion event is occurring further comprises requiring less third alarm conditions than first alarm conditions to determine that a network congestion event is occurring.

19. The method of claim 18, wherein the first alarm condition is representative of full node processor usage for at least 20 consecutive seconds, and the third alarm condition is representative of full node processor usage for at least greater than 30 seconds.

20. A method for use in a network comprising a plurality of entities, the plurality of entities including a plurality of nodes connected by trunks, each node including a node processor, each node including an adjacency value defined by a number of trunks connected to the node, the method comprising:

a) turning off at least one non-essential processor task at each node processor of a first set of nodes, wherein said first set of nodes are nodes running said at least one non-essential processor task, wherein said non-essential processor task comprises a task that does not prevent the node from transporting data packets;

b) reducing the adjacency value of a second set of nodes, wherein said second set of nodes are nodes having high adjacencies;

c) removing one or more of the plurality of entities from the network;

d) performing an operation on the removed one or more of the plurality of entities on the network;

e) restoring the adjacency value of the second set of nodes; and f) turning on the at least one non-essential processor task at each node processor of the first set of nodes.

21. The method of claim 20 wherein step b) further comprises selecting the second set of nodes base at least in part on the adjacency value of the nodes in the second set of nodes.

22. The method of claim 20 wherein step a) further comprises turning off at least one non-essential processor task comprising a task that determines more efficient routes for data packets.

\* \* \* \* \*